(12) United States Patent
Liu et al.

(10) Patent No.: US 10,194,414 B2
(45) Date of Patent: Jan. 29, 2019

(54) INFORMATION CENTRIC NETWORKING BASED SERVICE CENTRIC NETWORKING

(71) Applicant: Futurewei Technologies, Inc., Plano, TX (US)

(72) Inventors: Xuan Liu, Mission, KS (US); Ravishankar Ravindran, San Ramon, CA (US); Guo-Qiang Wang, Santa Clara, CA (US)

(73) Assignee: Futurewei Technologies, Inc., Plano, TX (US)

(*) Notice: Subject to any disclaimer, the term of this patent is extended or adjusted under 35 U.S.C. 154(b) by 752 days.

(21) Appl. No.: 14/148,509

(22) Filed: Jan. 6, 2014

(65) Prior Publication Data

US 2014/0192717 A1 Jul. 10, 2014

Related U.S. Application Data

(60) Provisional application No. 61/749,686, filed on Jan. 7, 2013.

(51) Int. Cl.
*H04W 60/00* (2009.01)
*H04L 29/08* (2006.01)

(52) U.S. Cl.
CPC .............. *H04W 60/00* (2013.01); *H04L 67/16* (2013.01); *H04L 67/327* (2013.01)

(58) Field of Classification Search
None
See application file for complete search history.

(56) References Cited

U.S. PATENT DOCUMENTS 8,565,689 B1 * 10/2013 Rubin .................. G06F 11/00
370/232
2002/0032800 A1 * 3/2002 Puuskari ............. H04W 76/022
709/246

(Continued)

FOREIGN PATENT DOCUMENTS

| CN | 101021916 A | 8/2007 |
| CN | 101442562 A | 5/2009 |
| CN | 101442714 A | 5/2009 |
| CN | 102609468 A | 7/2012 |

OTHER PUBLICATIONS

U.S. Appl. No. 61/695,764, Optimizing always-on wireless service for push-to-talk using network assistance and keep-alives, Sep. 25, 2012.*

(Continued)

*Primary Examiner* — Faruk Hamza
*Assistant Examiner* — Thinh D Tran
(74) *Attorney, Agent, or Firm* — Conley Rose, P.C.

(57) ABSTRACT

A method implemented by a network device residing in a service domain, wherein the network device comprises an information centric networking (ICN) transport layer and a service access layer (SAL) for handling context-aware service logistics and service mobility overlaid on the ICN transport layer, the method comprising receiving, in the ICN transport layer, a message comprising a service request that originates from a user equipment (UE), in the SAL, retrieving, from the service request, contextual information relevant to the UE or an access network connected to the UE, determining, based on the contextual information, one or more services needed to execute the service request, and determining one or more service identities (SIDs) each of which identifies one of the one or more services.

4 Claims, 35 Drawing Sheets

(56) References Cited

U.S. PATENT DOCUMENTS

| | | | |
|---|---|---|---|
| 2003/0120817 A1* | 6/2003 | Ott | H04L 12/1859 709/249 |
| 2004/0243680 A1 | 12/2004 | Mayer | |
| 2006/0153124 A1* | 7/2006 | Kant | H04W 8/087 370/328 |
| 2007/0189297 A1* | 8/2007 | Duan | H04L 12/14 370/394 |
| 2007/0226227 A1* | 9/2007 | Helfman | H04L 67/34 |
| 2010/0005478 A1* | 1/2010 | Helfman | H04L 67/327 719/315 |
| 2010/0202450 A1* | 8/2010 | Ansari | G06Q 30/04 370/389 |
| 2011/0167176 A1* | 7/2011 | Yew | G06F 13/4247 710/6 |
| 2012/0215911 A1 | 8/2012 | Raleigh et al. | |
| 2012/0317307 A1* | 12/2012 | Ravindran | H04L 12/6418 709/238 |
| 2013/0282920 A1 | 10/2013 | Zhang et al. | |
| 2014/0064209 A1* | 3/2014 | Anchan | H04W 72/0406 370/329 |

OTHER PUBLICATIONS

Foreign Communication From a Counterpart Application, PCT Application No. 14735230.6, Partial Supplementary European Search Report dated Nov. 18, 2015, 7 pages.

Ravinidran, R., et al. "ICN-based Contextualized Edge-Cloud Services" submitted to but was rejected by ACM SIGCOMM 2013, Aug. 12-16, 2013, Hong Kong, China, 6 pgs.

Ravinidran, R., et al. "Towards Software Defined ICN based Edge-Cloud Services", 2nd IEEE International Conference on Cloud Networking (IEEE CLOUDNET 2013), Nov. 11-13, 2013, San Francisco, CA, USA, 9 pgs.

Foreign Communication From a Counterpart Application, European Application No. 14735230.6, Extended European Search Report dated Apr. 26, 2016, 12 pages.

Machine Translation and Abstract of Chinese Publication No. CN101021916, Aug. 22, 2007, 6 pages.

Machine Translation and Abstract of Chinese Publication No. CN101442714, May 27, 2009, 6 pages.

Foreign Communication From a Counterpart Application, Chinese Application No. 201480003910.3, Chinese Office Action dated Jul. 5, 2017, 6 pages.

Foreign Communication From a Counterpart Application, Chinese Application No. 201480003910.3, Chinese Search Report dated Jun. 29, 2017, 2 pages.

Foreign Communication From a Counterpart Application, PCT Application No. PCT/CN2014/070238, International Search Report dated Apr. 3, 2014, 6 pages.

Foreign Communication From a Counterpart Application, PCT Application No. PCT/CN2014/070238, Written Opinion dated Apr. 3, 2014, 4 pages.

* cited by examiner

INFORMATION CENTRIC NETWORKING BASED SERVICE CENTRIC NETWORKING

CROSS-REFERENCE TO RELATED APPLICATIONS

The present application claims priority to U.S. Provisional Patent Application No. 61/749,686 filed Jan. 7, 2013 by Xuan Liu et al. and entitled "Method and Apparatus for Information Centric Networking Based Service Centric Networking", which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Service oriented architecture (SOA) related technologies have been around since late 1990s, and many current web services take advantage of this architecture. SOA introduces a subscriber-publisher model that provides loose coupling of service access interfaces and service implementations. SOA may comprise three players including a service consumer, a service provider, and a service broker, each inter-linked with another. Some SOA services may be described in a standard web service description language (WSDL). Web services may be resolved through a directory service referred to as universal description, discovery and integration (UDDI) registry, which acts as the service broker. A simple object access protocol (SOAP) may provide a binding relation between several decentralized web services. In addition to loose binding between service consumers and producers, the SOA may enable dynamic service discovery and delivery. SOA may provide a guideline for designing a service centric networking (SCN) framework which may be realized over any universal network layer, such as an information centric networking (ICN) transport layer.

From an end host perspective, current Internet Protocol (IP) networks, to an extent, may pre-bind an identity of a service and a location of the service. In other words, when resolving a service name, a domain name system (DNS) server may return an IP address which may directly locate the service or identify some other proxy (e.g. load balancer) that further resolves the service. Therefore, when a service migrates and binds to a new IP address, the existing sessions may be interrupted. An application running the service may accept dynamic updating, but it may need host-level stack modifications. Further, pre-binding may limit user mobility and device mobility, and thus prevent hosts from exploiting multi-homing features.

SUMMARY

In one embodiment, the disclosure includes a method implemented by a network device residing in a service domain, wherein the network device comprises an information centric networking (ICN) transport layer and a service access layer (SAL) for handling context-aware service logistics and service mobility overlaid on the ICN transport layer, the method comprising receiving, in the ICN transport layer, a message comprising a service request that originates from a user equipment (UE), in the SAL, retrieving, from the service request, contextual information relevant to the UE or an access network connected to the UE, determining, based on the contextual information, one or more services needed to execute the service request, and determining one or more service identities (SIDs) each of which identifies one of the one or more services.

In another embodiment, the disclosure includes a network device functioning as a heterogeneous access point (H-AP), the network device comprising at least one receiver configured to receive a publishing message that advertises a new service, a service access controller (SAC) coupled to the receiver and configured to add a new entry to a service access strategy table (SAST) in the SAC to reflect availability of the new service, and update the publishing message to generate an updated publishing message which comprises the H-AP as a prefix (e.g., a resolution prefix), and at least one transceiver coupled to the SAC and configured to forward the updated publishing message, and transmit, to a second network device functioning as an SRN, a notification message indicating that the new service is available from the H-AP.

In yet another embodiment, the disclosure includes a method implemented by a network device functioning as a point of attachment (PoA), the method comprising receiving, from a UE, a request for network registration, retrieving, from the request, access context of the UE which identifies the UE, updating one or more data structures in the PoA to include the access context and a default priority set for the UE, sending, to the UE, a prefix of the PoA as a response to the request, and sending, to a second network device functioning as an H-AP, a message notifying the H-AP of the registration request from the UE, wherein the PoA has registered with the H-AP.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1A:
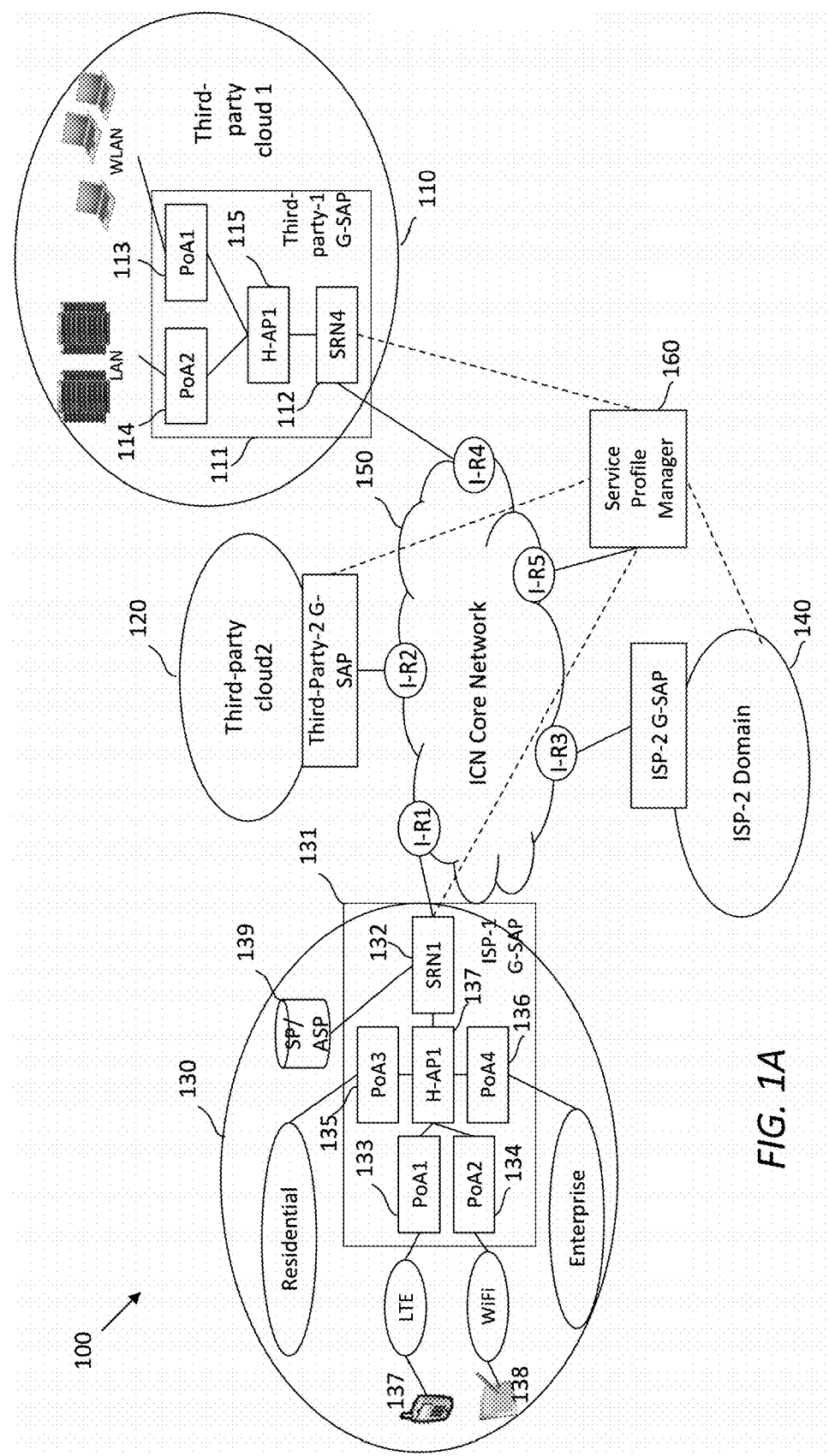
FIG. 1A illustrates an embodiment of an information centric networking (ICN)-based service centric networking (SCN) framework.

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Information Centric Networking (ICN) is a network model or architecture in which the focus is on locating and providing information to users rather than on connecting end hosts that exchange data. For example, in ICN-based communication, application requests may bind to the network layer over named entities (e.g., content object, user device, service) and de-couple its location and address information, which may eliminate the need for pre-binding. For another example, name-based routing with in-network caching may allow mobility to be handled in a scalable, efficient, and flexible manner. For yet another example, security credentials appended to the ICN packet may allow location independence of data and/or services, thereby helping to realize agile information dissemination.

Since an information exchange may be considered a case of service delivery, best effort services can be handled by an ICN layer, while services with performance constraints may be given special handling. Applying the SOA paradigm in an ICN environment may take advantage of the name-based networking approach to support dynamism at both a service producer end and a consumer end. Traditionally, services may be delivered by pre-provisioned end servers to which user requests are mapped. On the other hand, a service-centric ICN framework equipped with an ability to interpret user requests, intelligent caching and computing, and location-independent content delivery, may be leveraged to enable intelligent service management.

This disclosure teaches a service centric networking (SCN) framework over an ICN transport architecture to resolve a service name and a locator for a service provided in the architecture dynamically based on contextual information of a consumer of the service. Such contextual information may be relevant to a user equipment (UE) from where the service request is originated, an access network (e.g., a wireless, wired, or mobile connection) to which the UE is connected, or other information including location, time, social relationships, or combinations thereof. In the ICN-based SCN framework, an ICN-service layer (SL) is overlaid on an ICN transport layer, and the ICN-SL may be configured to handle context-aware service logistics and service mobility which will be further described. In a disclosed embodiment, to process a service request, a two-level decomposition approach may be used to first determine one or more services needed to process the service request, and then to decompose a service into a plurality of tasks, which represent instances of the service that may be available in a local service domain. A service routing mechanism may be used to navigate services as a result of the decomposition, which may be performed by a network device referred to herein as a service routing node (SRN), functioning as an ICN edge gateway with an ICN transport layer and additionally having an ICN-SL overlaid on the ICN transport layer. An SRN may be part of a generic service access point (G-SAP) platform, which may comprise other network functions such as a heterogeneous access point (H-AP) and a point of attachment (PoA). Components of the G-SAP platform may be deployed in an internet service provider (ISP) service domain and/or a third-party service domain to achieve various features disclosed herein, including context-aware service management, service routing management, and service producer mobility management.

There may be various motivations of building an ICN-based SCN framework. With an ICN-based Future Internet architecture, services may be more decentralized, around which information exchange may be built. ICN may lend itself to a platform that can meet this requirement since an ICN infrastructure may interpret a service prefix and may try to satisfy it with its local or global knowledge of content, computing and storage resources. From a service publishing perspective, the ICN framework may be flexible to enable anyone to publish a service from any device, and to make the service discoverable through a service discovery mechanism, both locally and globally. Therefore, from a consumer application point of view, service access may be transparent. This may be enabled through a localized service access point (SAP), which may be an ICN-enabled service gateway of a domain to which a consumer is currently registered. This gateway may have a SAP to manage service requests from its consumers. As a result, the consumer may be unaware or oblivious about which server is providing the service, but only needs to know that the returned content is a result of the service request.

More specifically, a first motivation of building an ICN-based SCN framework is to virtualize the ICN network as a multi-service network. In other words, service application may be deployed anywhere on a need basis over end hosts or the network infrastructure. A SL may be overlaid on an ICN transport layer and included in an ICN router that acts as a SAP. The SL may have functionalities for service management, such as transport-level services, service publish, service discovery, service resolution, service orchestration and composition, and context-aware management. In particular, the SL may also handle service-level routing decisions, which may be a special process of context-aware management and service orchestration. Service routing decision may be able to manage the service mobility in terms of data or application mobility.

A second motivation of building an ICN-based SCN is to develop a framework adaptive to device mobility and context changes. The framework may support not only services provided by large commercial data centers or clouds, but also services published by personal mobile devices. Device mobility management may support a service-level late-binding to its server's location within or outside a domain based on consumer properties.

Some of the principles in a SCN framework may include, but are not limited to: 1) loose coupling of service access interfaces and the corresponding implementation; 2) communication of services with each other through a standard interface, such as Simple Object Access Protocol (SOAP); 3) transparency of service logics to the external world such as the public internet; 4) decomposition of a request into multiple services requests, which may be reassembled as potentially complex service logic; and 5) ability to discover and reuse services.

In an ICN-based SCN framework, on the application level, the service layer may abstract itself as a "socket" that an ICN application may leverage to meet both transport and service level objectives. Transport spans control over aspects such as receiver-oriented transport, request reliability and service level objectives including supporting for both consumer and producer dynamism, such as mobility, service management functions. Examplary service management functions may include service publishing, service discovery, request service, and multiplexing and/or de-multiplexing functions that span application to user to device-level requirements.

Furthermore, services may be dynamically provisionable in an ICN-based SCN framework. The dynamism may include the ability to name a service, associate desirable properties to the service, publish the service so that it is discoverable, and resolvable in an optimal approach. Moreover, the framework may be adaptive to user context and may ensure the quality of experience (QoE) for the user. The contextual aspects may include mobility of user or device, and access network change within or between service providers.

FIG. 1A illustrates an embodiment of an ICN-based SCN framework or architecture 100, in which disclosed embodiments may operate. The framework 100 may be formed by interconnecting a number of service domains, such as domains 110, 120, 130, and 140, which may be overlaid on an ICN core network 150, as shown in FIG. 1A. These service provisioning domains may be classified into two or more categories. As a first exemplary category, third-party service domains 110 and 120 may be application service providers (ASPs) that may support cloud and/or content services. The ASPs may be relatively large enterprises, such as GOOGLE, AMAZON, NETFLIX, etc., and may own their own network infrastructure, such as GOOGLE fiber. As a second exemplary category, ISP service domains 130 and 140 may own the network infrastructure and support service access to user equipment (UEs).

An ISP service domain may belong to an ISP, such as AT&T, COMCAST, and SPRINT. The ISP service domain may provide wired broadband connectivity, e.g., via residential or enterprise networks, and/or radio access connectivity, e.g., via WiFi, long term evolution (LTE), third generation (3G), Worldwide Interoperability for Microwave Access (WiMAX), and other wireless technologies. For example, the ISP service domain 130 may provide UE 137 (shown as a cell phone) with LTE connectivity and provide UE 138 (shown as a tablet) with WiFi connectivity.

Services within a domain may be centralized or decentralized, and may be accessed through a generic service access point (G-SAP) platform. Hence, an ICN-based SCN may be considered a network of G-SAPs overlaid on an ICN transport. G-SAPs may be utilized by various types of service domains, such as ISPs or third-party service domains. For example, a G-SAP 111 may reside in the third-party service domain 110, while a G-SAP 131 may reside in the ISP service domain 130. This framework may be generic enough to support services known today and also future services.

A service producer or a service consumer may be a device with one or more Layer 2 (L2) interfaces of the Open Systems Interconnection (OSI) model. In the framework 100, a G-SAP may support L2 agnostic seamless service mobility while providing adaptive and context-aware service resolution for producers and consumers (end-to-end). A G-SAP may be a collection of service-aware nodes equipped with a SAL. For example, the G-SAP 111 may comprise an SRN 112, a point-of-attachment (PoA) 113, a PoA 114, and a heterogeneous access point (H-AP) 115. The H-AP 115 may handle the mobility of a service producer or consumer. For another example, the G-SAP 131 may comprise an SRN 132, four PoAs 133-136, and an H-AP 137. The H-AP 115 or 137 may handle the mobility of a service producer or consumer. Some or all of the G-SAPs and interior routers (I-Rs) may be managed by a service profile manager (SPM) 160, which may be a centralized network device for network-wide management.

The SRN 132 may be coupled or connected to a service provider (SP) or ASP 139. Further, UEs in a residential or enterprise network may communicate with SRNs, such as the SRN 132, via a user-network-interface (UNI) based application programming interface (API). On the other hand, an SRN, such as the SRN 132, may communicate with other SRNs, service controllers, or the SPM 160 via a network-network-interface (NNI) based API.

In the framework 100, some or all network routers may support features such as name-based routing, in-network caching and computing, and content level security semantics. For example, a SAL overlaid on ICN may be incorporated to support SCN, which may span hosts and the network. In the framework 100, a service-aware router (e.g., gateway), which may be referred to herein as a service routing node (SRN), may help meet user requirements in collaboration with other SRNs. For example, an SRN 112 located in the domain 110 and an SRN 132 located in the domain 130 may interact I-Rs located with the ICN core network 150 for their respective domain, as shown in FIG. 1A. From the perspective of a service producer, an SRN may be the globally known locator of the service published locally. From the perspective of a service consumer, the SRN may be the gateway to resolve local services and other services.

Figure 1B:
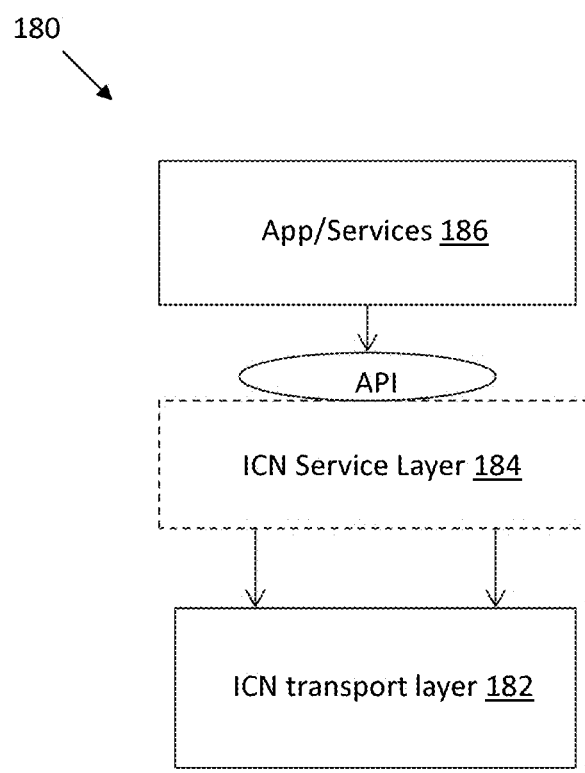
FIG. 1B illustrates an embodiment of a simplified architecture with a service access layer (SAL).

As mentioned above, devices in a network may be virtualized via ICN-based SCN as a service engine. FIG. 1B illustrates an embodiment of a simplified architecture 180, which may comprise an ICN transport layer 182, an ICN service layer (ICN-SL) 184, and applications or services 186. The ICN-SL 184 may be a generic layer that may be used as a SAL on the user end or a SAP on the network end. For example, the ICN-SL 184 may be built over the ICN transport layer 182, which may be included in an ICN router that acts as a SAP. The ICN-SL 184 may have functionalities for service management, such as transport-level services, service publish, service discovery, service resolution, service orchestration and composition, and context-aware management. The ICN-SL 184 may also handle service-level routing decisions, which may be a special process of context-aware management and service orchestration. Moreover, the ICN-SL 184 may communicate with the applications or services 186 via an API.

Figure 2:
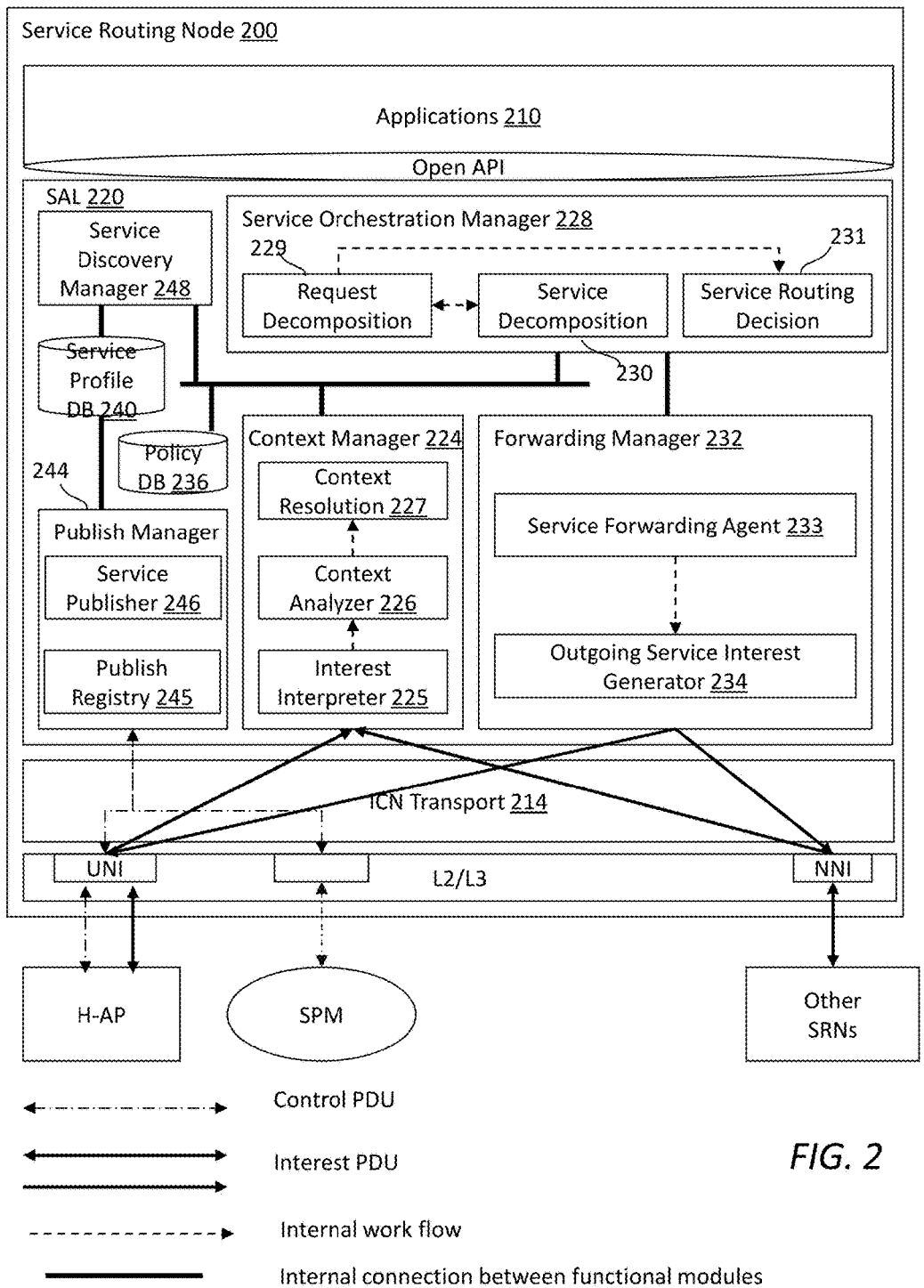
FIG. 2 illustrates an embodiment of a service routing node (SRN).

Components of the framework 100 are described in more details next. FIG. 2 illustrates an embodiment of an SRN 200, which may be used in the framework 100, e.g., implemented as the same as or similar to SRNs 112 and 132. The SRN 200 may be a service gateway that may serve as a resolution point for various kinds of services. Therefore, the SRN 200 may serve multiple functions such as process context analysis, service orchestration, service discovery, service routing management, and service publishing.

The SRN 200 may process user requests considering their contextual requirements supplied by an application. The SRN 200 may also use SRN service logic processing capability to carry out service functions such as context analysis, service orchestration, service discovery, and service forwarding management. Further, the SRN 200 may serve as the gateway for service producers to assist with service management functions such as service publish, service announcement, routing and resolution. In addition, the SRN 200 may coordinate with PoA and H-AP to aid service producer mobility.

The SRN 200 may comprise applications 210 and a SAL 220 which may separate service logical control functions from an ICN forwarding plane. An open API 212 may be used between the applications 210 and the SAL 220. Further, an ICN transport layer 214 may be used for the SAL 220 to communicate with other network devices, such as an H-AP, a SPM, and other SRNs. The SAL 220 may comprise various modules or units including a context manager 224, a service orchestration manager 228, a service forwarding manager 232, a policy database (DB) 236, a service profile DB 240, a publish manager 244, and a service discover manager 248.

The context manager 224 may be configured to manage context-aware service resolution, and may comprise components including an interest interpreter 225, a context analyzer 226, and a context resolution module 227. The interest interpreter 225 may interpret incoming interest, and retrieve a context part from the interest. The context part may be a device type, network access provider type, mobility context, environment context, etc. The context analyzer 226 may collect context information from an original service interest packet and translate the collected context information into a standard service description format. By querying the policy DB 236 and invoking the service discovery manager 248, the context resolution module 227 may resolve context-oriented service description(s) to a corresponding actionable service identifier(s) (ID), which may then be updated in the policy DB 236, if necessary.

The service orchestration manager 228 may be configured to create a service logic operation graph, which may guide service forwarding. The service orchestration manager 228 may carry out various functions (represented by functional boxes in FIG. 2). In a request decomposition function 229, the service orchestration manager 228 may decompose an initial service request into a number of services, and then invoke the service discover manager 248 to determine if any of these services have local instantiation, by querying the service profile DB 240. If a service is determined to be locally resolvable, the service orchestration manager 228 may invoke a service decomposition function 230. By looking up the service profile DB 240 and policy DB 236, the service decomposition function 230 may further decompose a service into multiple tasks. The tasks may be processed by servers in the same domain or different domains. By performing a function of service routing decision 231, the service orchestration manager 228 may create an overall service logic graph, which may present relationships between different services, albeit not between tasks.

The service forwarding manager 232 may be configured to process the service logic created by the service orchestration manager 228, and forward the service logic to a next hop service interest. More specifically, the service forwarding manager 232 may comprise a service forwarding agent 233 configured to process and update a service navigation vector and determine an ID of the next-hop service. The service forwarding manager 232 may further comprise an outgoing service interest generator 234 configured to generate, based on the next-hop service ID, one or more outgoing service interest packets with updated service navigation fields. A routable service prefix may be associated with the service interest to conduct name-based routing.

The policy DB 236 may be configured to store policies for context translation as well as mapping relationships between context-oriented service description and corresponding service ID. By invoking the service discovery manager 248, mapping relationship entries can be committed to the policy DB 236 by the context resolution module 227 as new resolutions results. The service profile DB 240 may be configured to locally store service information, such as service ID, service description, and mapping to resolution point such as local service location or remote resolution domain information. The remote service resolution point information may be added by the publish manager 244.

The publish manager 244 may be configured to handle service publishing management function from users. The publish manager 244 may comprise a publish registry 245 and a service publisher 246. The publish registry 245 may manage a new service registration from a service producing entity such as an end user, an in-network service function, or a third-party application service provider (ASP). In an embodiment, the publish registry 245 may update the service profile DB 240 to register a new service publish action from a service producer. In other words, the publish action of the new service may be updated in the SRN 200.

Note that management of registration may include name space delegation based on whether the service has a local or global scope, interacting with service producers to enable or disable service availability, etc. The service publisher 246 may publish a newly available service to a service profile manager, such as the service profile manager 160. The service profile manager may notify the service publisher 246 about the resolution points of producers who may support the same service. In turn, the service publisher 246 may update the service profile DB 240.

In addition, the service discovery manager 248 may be configured to process a service description, and return a corresponding service ID as well as the information to resolve a service. A person of ordinary skill in the art will recognize that the functions, modules, or units disclosed herein may be implemented via any suitable approach, e.g., via hardware or a combination of hardware and software.

Figure 3:
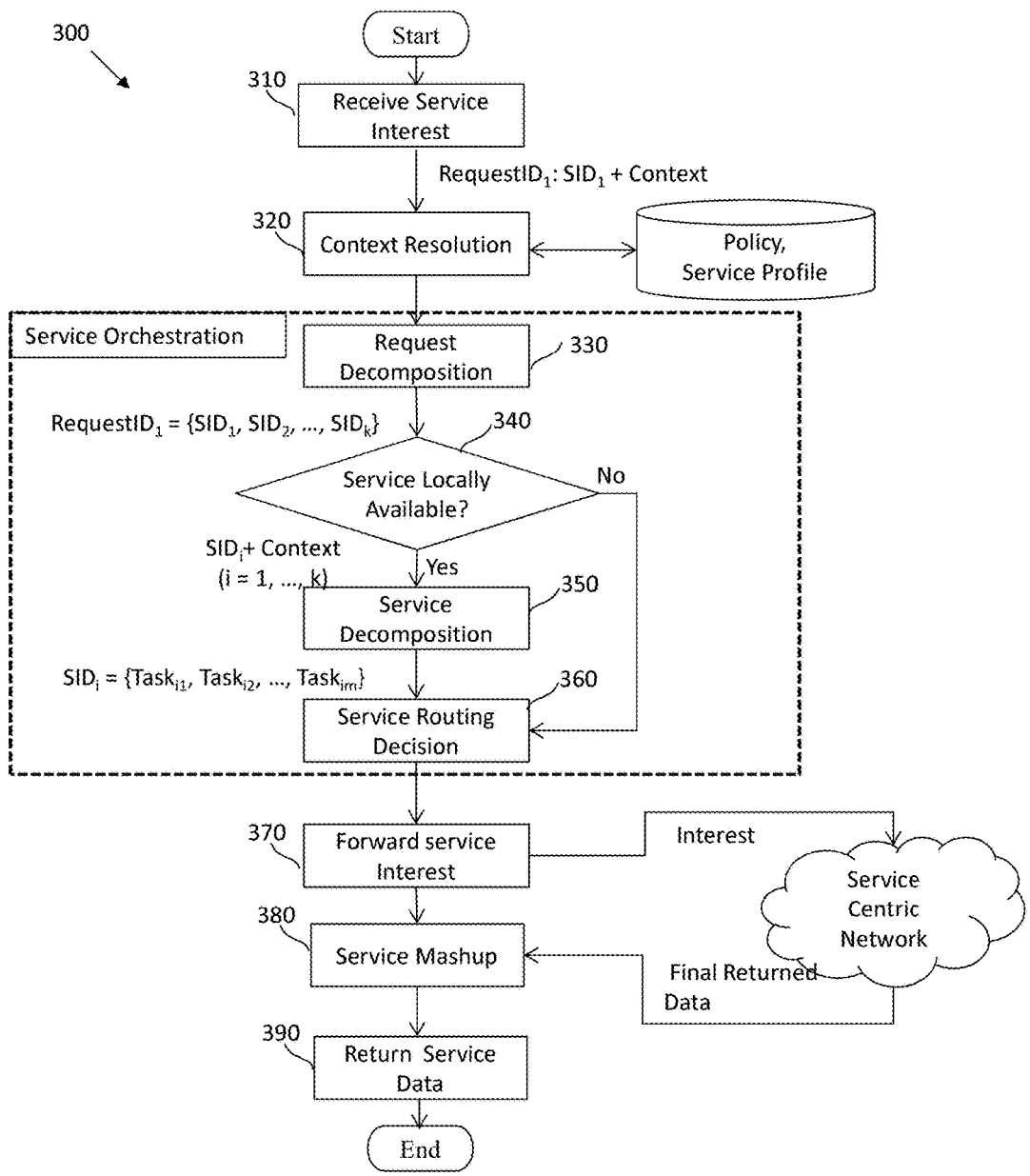
FIG. 3 illustrates an embodiment of a service request processing method.

FIG. 3 illustrates an embodiment of a service request processing method 300, which may process a service request and resolve a requested service name to a specific domain based on a user's contextual requirements. This procedure may occur at the ICN-enabled gateway (SRN) of a domain, where a SAL may be overlaid with the ICN transport layer on the gateway, e.g., as shown in FIG. 1B. To differentiate from content interest, the term "request" may be used herein to indicate an initial service interest sent from a consumer's application. A request may include, but not limited to, a service ID and context metadata from the consumer from which it was sent.

The method 300 may start in step 310, in which an SRN in a G-SAP platform (e.g., the SRN 200) at a service domain may receive a service interest. The service interest may comprise a service request identifiable via a request ID (denoted as $RequestID_1$) and context. In step 320, the SRN may process context information associated with the initial interest, by checking it against a service profile manager, e.g., in the service profile DB 240, and relevant policies, e.g., in the policy DB 236. In step 330, the original service request may be decomposed into a number of different services. For example, the request identifiable via $RequestID_1$ may be decomposed into services identifiable via service IDs denoted as $SIDs$ $SID_1$, $SID_2$, ..., $SID_k$, where k is an integer greater than one. Note that since service IDs may distinctly identify services, a service may be represented simply by its service ID (SID).

In step 340, the SRN may look up the service profile DB to determine if any of these services are available locally. If the condition of the step 340 is met, the method 300 may proceed to step 350; otherwise, the method 300 may proceed to step 360.

In step 350, a service has a local entry point, namely, it may be available in the same domain. Thus, the SRN may decompose the service into multiple service tasks (in short as tasks). For example, a service identifiable via $SID_i$ may be decomposed into tasks identifiable via task IDs denoted as $Task_{i1}$, $Task_{i2}$, ..., $Task_{im}$, where i and m are integers and i is no greater than k. If a service does not have an entry point locally, according to step 340, the corresponding service ID may be kept for constructing a service logic graph without further decomposition.

When the SRN has performed decomposition at the request level and/or service level, in step 360, the SRN may run a service routing decision process to generate a logic service graph. Note that, in the disclosed SCN framework, service orchestration may include both service decomposition and routing management. After finishing the service orchestration, in step 370, the SRN may forward or push the service interest dictated by the service logic graph down to an ICN transport layer. In step 380, the SRN may combine results from multiple service producers to generate a response using returned data from the network. In step 390, the SRN may return data back to the customer or may return a handle to retrieve the data.

Figure 4:
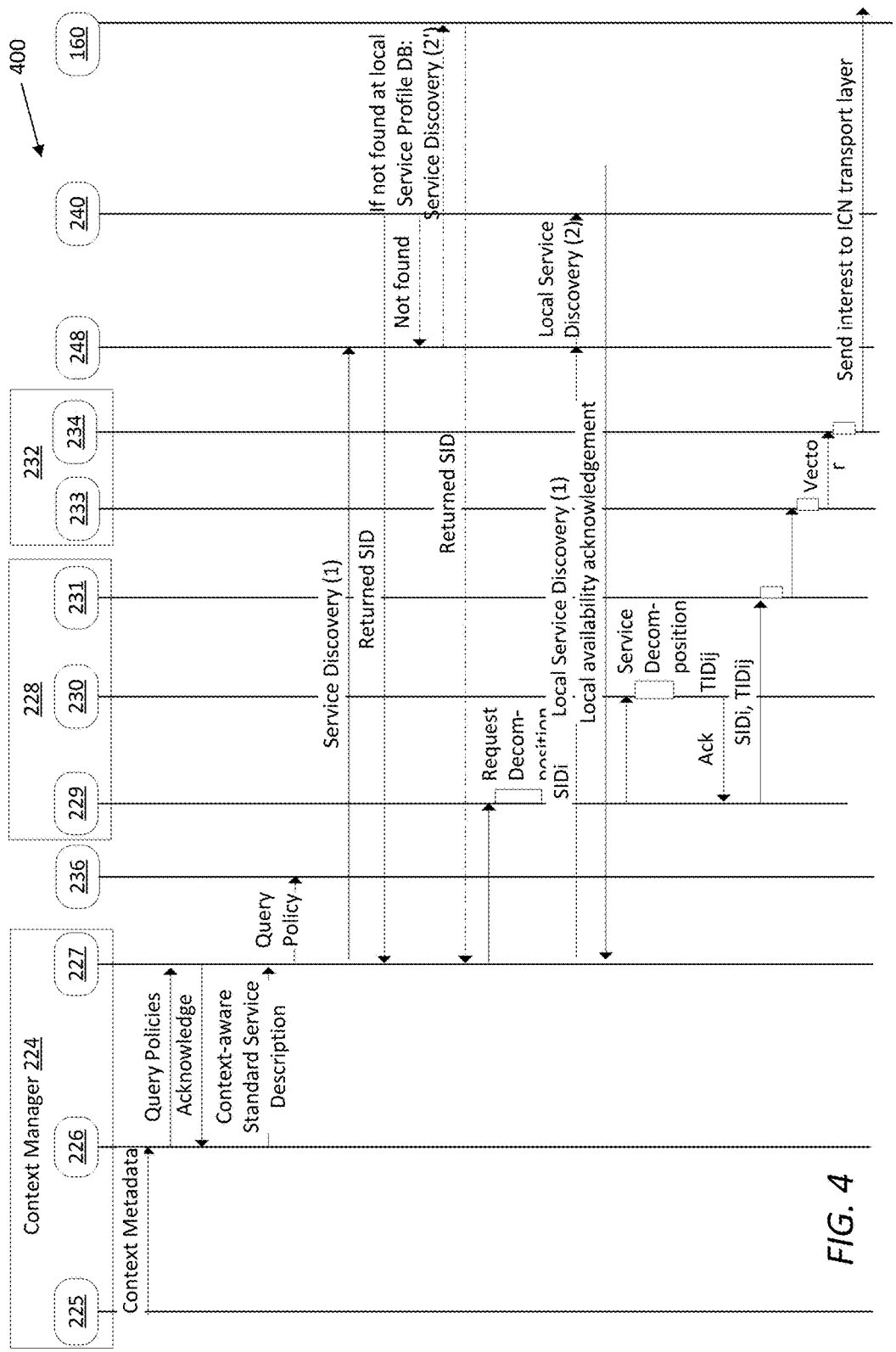
FIG. 4 illustrates an embodiment of message exchanges among functional modules within an SRN.

To further clarify functioning of an SRN, FIG. 4 illustrates an embodiment of a work flow 400 showing message exchanges among functional modules or units within the SRN 200 and between the SRN and the SPM 160. In use, a service request message comprising an interest packet may be received comprising context metadata or contextual information. The contextual information may be relevant to the UE or an access network connected to the UE. The interest interpreter 225 may send the context metadata to the context analyzer 226, which in turn may query or look up policies stored in the policy DB 236. The policy DB 236 may return an acknowledgement to the context analyzer 226, which may then send a context-aware standard service description to the context resolution module 227. The context resolution module 227 may then query the policy DB 236 again, which returns with another acknowledgement.

The context resolution module 227 may translate the contextual information in the interest packet into a service description written in a service description language. Further, the context resolution module 227 may send the description to the service discovery manager 248 and then to the service profile DB 240, in which the service description may be mapped to one or more corresponding SIDs. After service discovery, the service profile DB 240 may return the SID to the context resolution module 227. If no SID corresponding to the service description is found in the service profile DB 240, the SPM 160 may be contacted for further service discovery. After determining a SID, the SPM 160 may return the SID to the context resolution module 227.

Next, the service request may be decomposed into one or more services by the request decomposition function 229. A service in the decomposed services may be discovered again by the service discovery manager 248 using the service profile DB 240. If a service is available locally (in a service domain comprising the SRN 200), an acknowledgement may be returned to the request decomposition function 229.

For a service that has at least one instance locally available, the service may be further decomposed into a plurality of tasks corresponding to service instances. After full decomposition, a service logic graph and its corresponding service navigation vector may be generated by the service forwarding agent 233. The outgoing service interest generator 234 may pack the service logic graph and/or the service navigation vector into an outgoing interest, which may be sent to an ICN layer of the SRN 200.

Figure 5:
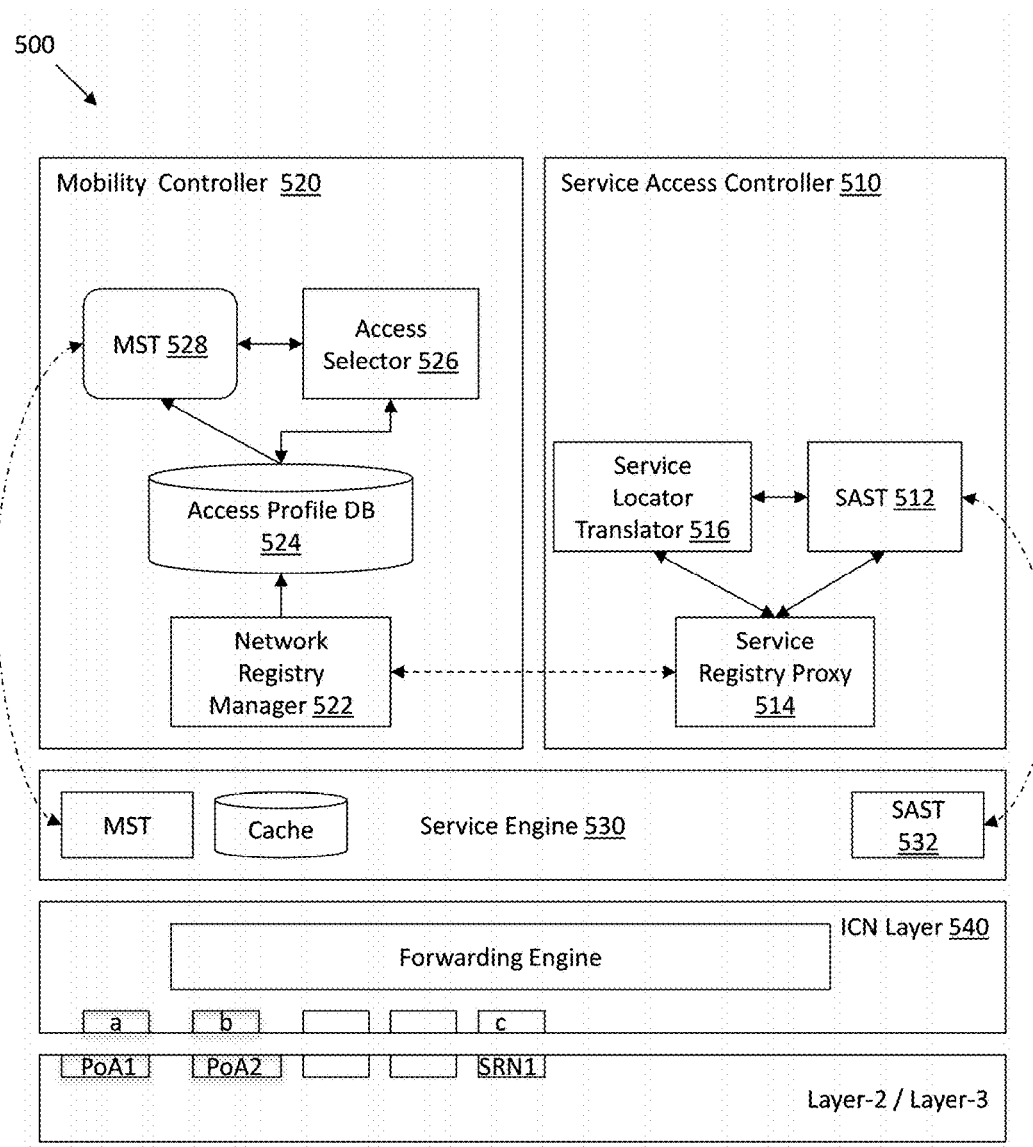
FIG. 5 illustrates an embodiment of a heterogeneous access point (H-AP).

FIG. 5 illustrates an embodiment of an H-AP 500 which is a component for mobility management in an ICN-based SCN framework (e.g., the framework 100). Within the SCN framework, the H-AP 500 may be the gateway of an ICN-enabled ISP. The H-AP 500 may be used when users or applications are multi-homed. The H-AP 500 may comprise a service access controller (SAC) 510 which may serve as a service access anchor and a mobility controller (MC) 520 which may serve as a network access anchor. A service engine 530 and an ICN layer 540 sitting beneath the SAC 510 and the MC 520 may be configured to process service-level forwarding.

The SAC 510 may maintain a service access strategy table (SAST) 512 configured to support service indirection. The SAC 510 may further comprise a service registry proxy 514 configured to processes a service publishing message from a UE or a SAST update message from a network registry manager 522 residing in the MC 520. The service publishing message may carry information such as service ID, service access prefix, service publish priority, service producer, service attributes such as TTL, access control policies. The SAC 510 may further comprise a service locator translator 516 in the control plane configured to send the service publishing message to an SRN (e.g., the SRN 200) for further processing.

More specifically, the SAST 512 may be a table reflecting service access status for service indirection references. In an example embodiment, the SAST 512 may have five fields: <Service Identity, Service Access Context, Service Status, Priority, time to live (TTL)>, as shown in Table 1. Service identity may be a persistent name of a service, such as a SID. Service access context may show resolution point information of the service, such as associated PoAs and UEs. Service status may indicate a status of the service, such as being accessible (indicated by Y) or inaccessible (indicated by N). Priority, with exemplary values 1-3 in Table 1, may indicate a priority of the service access context, as determined by the user or the device. Finally, TTL, with exemplary values denoted as $t_1$-$t_4$ in Table 1, may indicate a belief time of the service.

TABLE 1

An exemplary SAST

| Service Identity | Service Access Context | Access Status | Priority | TTL |
|---|---|---|---|---|
| <SID1> | <PoA1>: <UE1> | Y | 1 | $t_1$ |
| | <PoA1>: <UE2> | Y | 2 | $t_2$ |
| | <PoA2>: <UE1> | N | 1 | $t_3$ |
| | <PoA2>: <UE2> | Y | 3 | $t_4$ |

Referring back to FIG. 5, in an embodiment, when a new service is published from a UE, a corresponding publishing message may first arrive at the SAC 510. The service registry proxy 514 may process the publishing message and send it to the service locator translator 516. The service locator translator 516 may add a new entry to the SAST. The service locator translator 516 may then update the service publishing message with a prefix of the H-AP 500. The service locator translator 516 may send a response to the service registry proxy 514, which in turn may notify an SRN that this new service is available from the H-AP 500.

The MC 520 may play the role of a network access anchor point and may provide mobility management for UEs based on network attachment properties. In other words, the MC 520 may handle interest and data between PoAs (e.g., between PoAs 133 and 134) during hand offs. In an embodiment, the MC 520 may comprise a Network registry manager 522, an access profile DB 524, an access selector 526, and a mobility strategy table (MST) 528, arranged as shown in FIG. 5.

The network registry manager 522 may take network attachment requests from PoAs, input registration information into the access profile DB 524, and update the MST 528. The access profile DB 524 may store detailed information about UE's network connectivity registration. The access selector 526 may be a smart module to update a corresponding priority entry in the MST 528, based on policies. The MST 528 may be a table configured to store network access context information for mobility of user devices. The MST 528 may be constructed when a device registers the network connectivity. The MST 528 may help to direct interests to a proper access network in case of a service producer, by avoiding unnecessary multicasting.

Table 2 shows exemplary fields of the MST 528, which may comprise two fields: access context states and priority information. Access context may indicate a network connectivity prefix, such as <PoA1>:<UE1>. Priority information may indicate the priority of forwarding. Note that a value of the priority may be dynamically updated by the access selector 526.

TABLE 2

An exemplary MST in an H-AP

| Access Context States | Priority |
|---|---|
| <PoA1>: <UE1> | 1 |
| <PoA2>: <UE1> | 2 |
| <PoA1>: <UE2> | 1 |
| <PoA2>: <UE2> | 1 |

Referring back to FIG. 5, the service engine 530 may comprise a SAST 532 and may conduct interest and data forwarding processing as required by service applications, which may include functions resulting from the MST 528 and/or the SAST 512. During the hand off process, interests and/or data may be cached at the service engine 530. In addition, the ICN layer 540 may facilitate communication between the upper layers and lower layers (e.g., layer 2 and layer 3).

Figure 6:
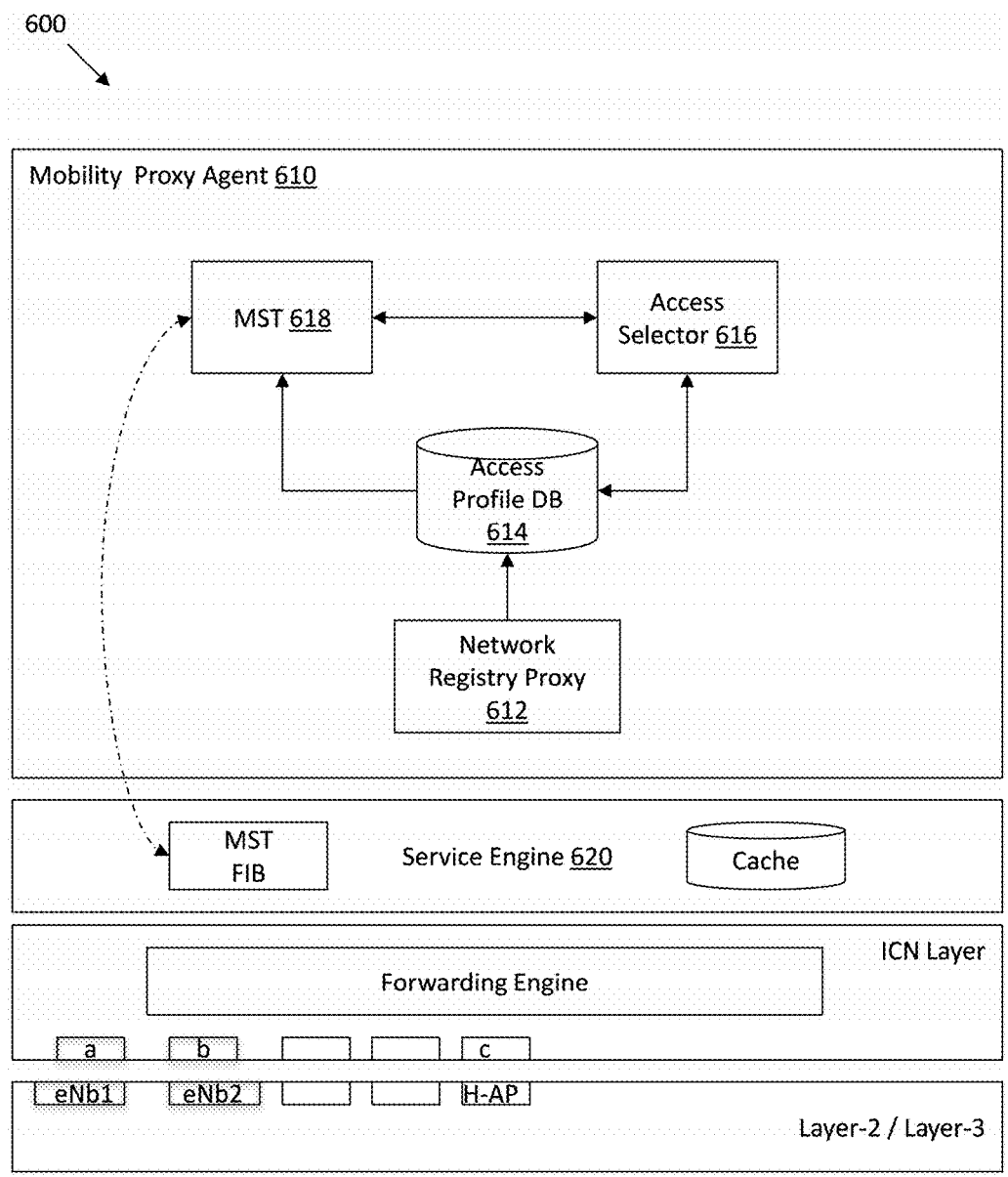
FIG. 6 illustrates an embodiment of a point of attachment (PoA).

FIG. 6 illustrates an embodiment of a PoA 600, which may be implemented in an ICN-based SCN framework (e.g., the framework 100). The PoA 600 may be an ICN-enabled access network gateway, which may provide connectivity to a UE and support control plane functions to aid service mobility between multiple devices. The PoA 600 may comprise a Mobility Proxy Agent (MPA) 610, which may play a role as a network attachment proxy that is in charge of network access registration for UEs. As shown in FIG. 6, the MPA 610 may comprise a network registry proxy 612, an access profile DB 614, an access selector 616, and an MST 618. It can be seen that the MPA 610 may have similar system view as an MC (e.g., the MC 520) in an H-AP (e.g., the H-AP 500). In the interest of conciseness, further descriptions will focus on aspects that are different or not yet covered. The same principle applies to other drawings described herein.

In use, the MPA 610 may have information about a prior registration of the PoA 600 in an H-AP. Thus, when a UE sends a request for network registration, the PoA 600 may respond to the UE with an H-AP prefix and also send a notification to the H-AP about a connection request from the UE. The network registration request message may carry information such as a device ID for the UE and the corresponding TTL.

Table 3 shows exemplary fields of the MST 618, which may be similar to the exemplary MST 528 shown in Table 2. Access context may indicate a network connectivity prefix, such as <UE1>, and priority information may indicate the priority of forwarding.

TABLE 3

An exemplary MST in a PoA

| Access Context States | Priority |
|---|---|
| <UE1> | 1 |
| <UE2> | 2 |

Referring back to FIG. 6, a service engine 620 residing in the PoA 600 may play the same or a similar role as the service engine 530 in the H-AP 500. One difference is that the service engine 620 may not have a SAST (note that the service engine 530 has a SAST 532), as the PoA 600 may not contain a SAC module.

Figure 7:
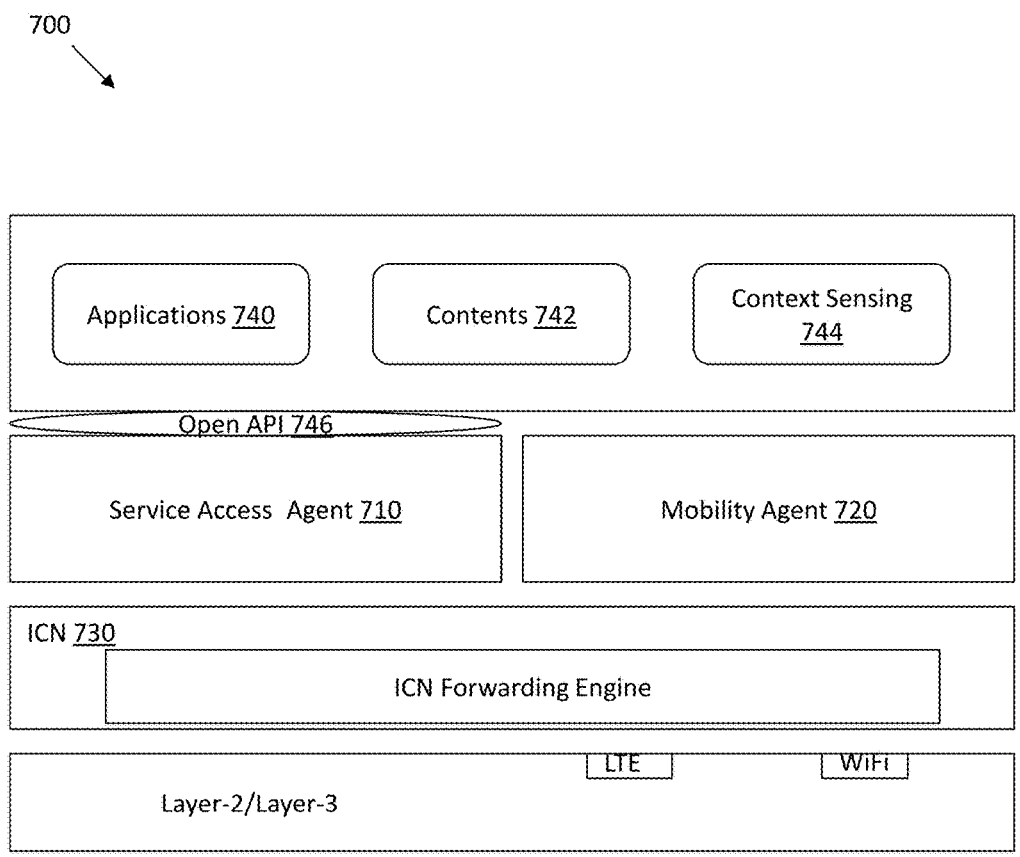
FIG. 7 illustrates an embodiment of an ICN-enabled user equipment (UE).

FIG. 7 illustrates an embodiment of an ICN-enabled UE 700, which may be implemented in an ICN-based SCN framework (e.g., the framework 100). UEs may refer to any applicable ICN-enabled devices, such as smartphone, tablet, laptop, desktop, and other types of devices with one or more radio access interfaces such as LTE, WiFi, and WiMAX. In addition to being service consumers, UEs themselves can also be service producers. The UE 700 may comprise a service access agent (SAA) 710 and a mobility agent (MA) 720 over an ICN layer 730. The MA 720 may take responsibility of network connectivity registration, and the SAA 710 may handle service-relevant functions. The MA 720 may also interact with the SAA 710 on the control level to help with service management functions. The UE 700 may further comprise one or more of applications 740, contents 742, and/or context sensing module 744. The applications 740 may communicate with the SAA 710 via a standard interface, such as Open API 746. The Open API 746 may provide service-level management transport functions, such as multiplexing, de-multiplexing, quality of service (QoS), flow control, and so forth.

Figure 8:
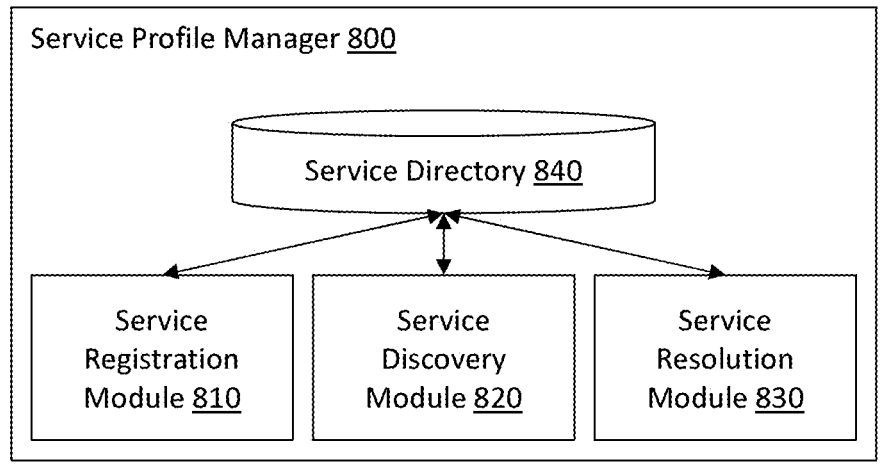
FIG. 8 illustrates an embodiment of a service profile manager (SPM).

FIG. 8 illustrates an embodiment of a SPM 800, which may be implemented in an ICN-based SCN framework (e.g., the framework 100). The SPM 800 may be a logical entity that provides centralized management for SRNs. The SPM 800 may facilitate global service publishing, service discovery, service resolution, and other functionalities. Arranged as shown in FIG. 8, the SPM 800 may comprise its functional blocks including a service registration module 810, a service discovery module 820, a service resolution module 830 and a service directory 840.

The service registration module 810 may process service publish messages from SRNs and update the service directory 840. The service discovery module 820 may receive a service description from SRNs or UE applications, and may return relevant service IDs after looking up the service directory 840. The service resolution module 830 may resolve the service IDs into globally known locator information for SRNs. The service directory 840 may be implemented as a global service profile database, which may include, for a service, at least a service ID, global locator for the service, a service description, and TTL. The service directory 840 may be represented as an extensible markup language (XML)-based schema.

Figure 9A:
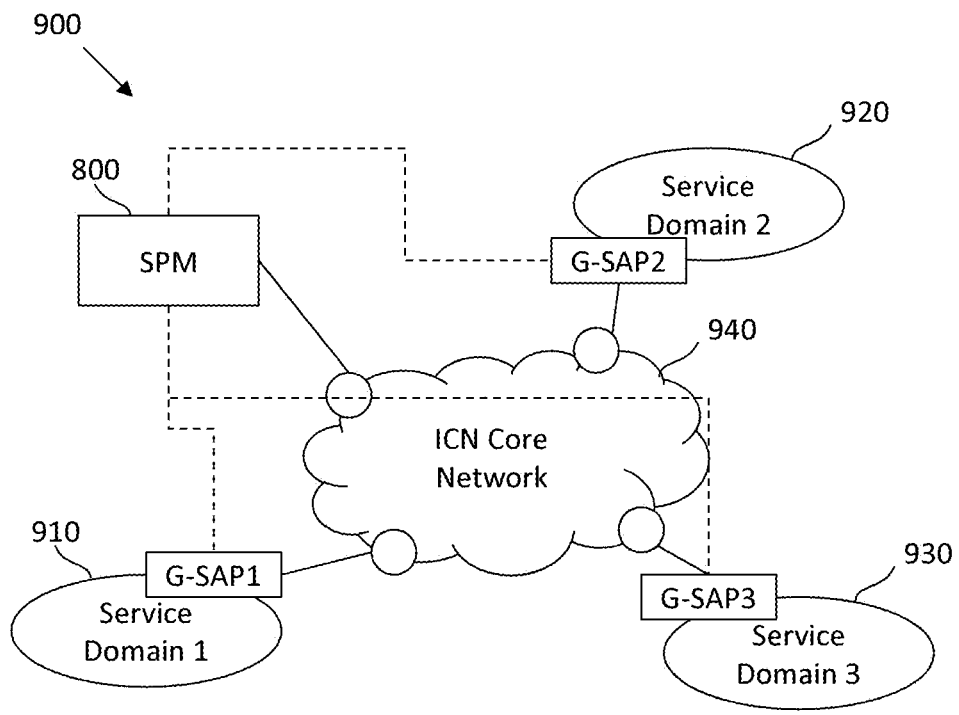
FIG. 9A illustrates an embodiment of another ICN-based SCN framework.

The SPM 800 may be deployed to manage multiple domains, or alternatively on a per-domain basis (i.e., with multiple SPMs for multiple domains). FIG. 9A illustrates an embodiment of an ICN-based SCN framework 900, in which the SPM 800 is configured to manage a plurality of service domains 910, 920, and 930. Recall that each of the service domains 910, 920, and 930 may have a G-SAP configured to communicate with an ICN core network 940 via edge nodes.

Figure 9B:
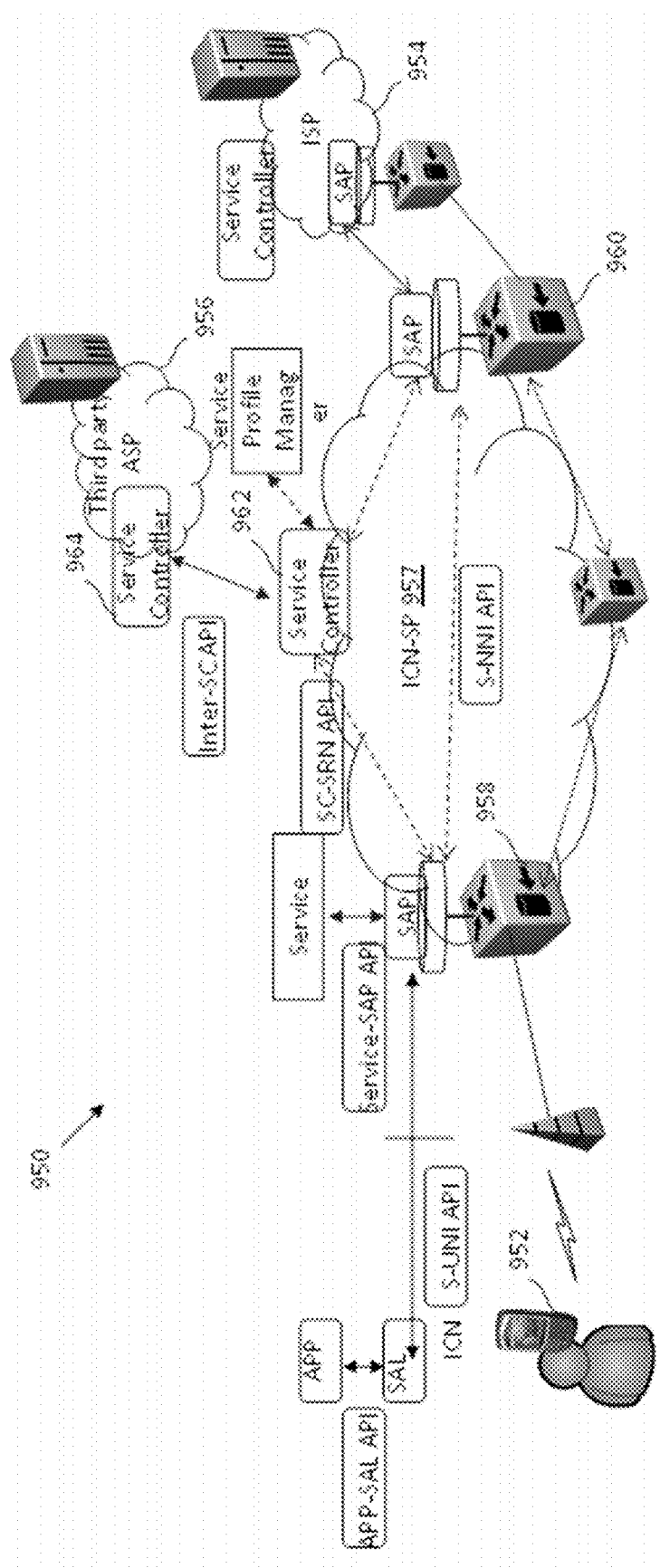
FIG. 9B illustrates an embodiment of another network framework.

FIG. 9B illustrates an embodiment of a network framework 950, which may enable end-to-end edge cloud services. The control and physical elements enabling an edge-cloud framework are shown along with open-APIs between a user 952, an ISP 954, and an ASP 956 through an ICN-SP 957. The implementation of the open-APIs between network devices may vary. For example, an SAL in the user 952 may communicate with an SAP in an SRN 958 via a service user-network-interface (S-UNI) API. The SRN 958 may communicate with another SRN 960 via a service network-network-interface (S-NNI) API. Further, the SRN 958 may further communicate with a service controller (SC) 962 via a SC-SRN API.

The SC 962 may be a logically centralized entity interfacing with other SCs, such as an SC 964, through inter-SC API in third party domains to accept service management requests such as provisioning resources, and conveying policy management instructions to service instances. Inter-SC API requests for service management such as managing service resources may be handled in the ICN-SP 957 through a SC-SRN API to convey service instructions to SAP instances in SRNs. The SCs in multiple domains may interact to populate services available in each other's domain for local use, and these interactions could be policy driven.

Figure 9C:
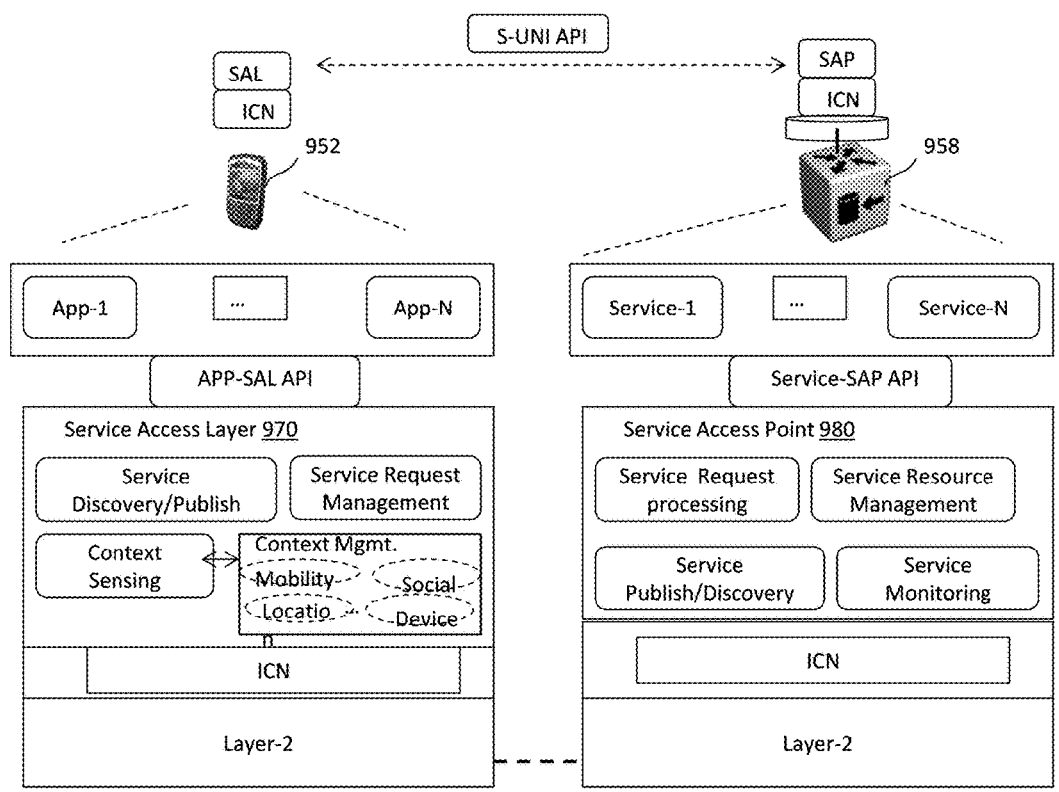
FIG. 9C illustrates an embodiment of functions offered by a service access layer (SAL) on the user end and a service access point (SAP) on the network end.

As described above, the ICN-SL structure on the user end and network end are similar but may have different functions. FIG. 9C illustrates an embodiment of functions offered by an SAL 970 on the user end (e.g., the user 952) and an SAP 980 on the network end (e.g., the SRN 958). The SAL and SAP may facilitate contextual interaction between the users and ICN-SP. Part of the functions have been described above, thus further discussion will focus on aspects that are not yet covered.

On the user or end host end, the SAL 970 may handle service layer control, forwarding, and contextual functions. Control functions may include the ability to discover, publish, and request services from the network over the S-UNI API. Applications may leverage the SAL 970 through an application (APP)-SAL API. When applications request context support, the SAL 970 may interact with its context sensing functions to obtain real time state of the context to be included in the service request. Various contextual information such as mobility context, location context, social context, and device context may be used. For example, location context may imply obtaining real-time location information. In addition, forwarding functions may include the mux/demux of application requests and those related to adapting service flows to varying user context such as mobility.

On the network end, the SRN 958 may host ASP or ISP services over the SAP 980. Services may access the SAP 980 through a service-SAP API. The Service-SAP API may provide support functions for ASP service to meet its service objectives, such as service discovery to augment its own service, real time statistics of service, storage graphs and resource utilization, and executing multi-hop service processing logic involving its own or other services distributed in ICN-SP. Some service SRNs without the S-UNI may also reside in the ICN core network. These nodes may also act as gateways to services hosted in data centers or third party ASP domains. Further, the SRN 958 may interact with the ICN core to obtain global topology information and help services to orchestrate service routing logic while processing user requests. Inter-domain SRN interaction among ISPs and ASPs can be realized to enable multi-domain service composition and routing logic.

According to an ICN naming scheme, a service name may be defined in the form of <P>:<I>:<D>, wherein P stands for "Principal", I stands for "Identity", and D stands for "Domain". This naming scheme is described in U.S. patent application Ser. No. 13/729,897 to X. Zhang, et al. and entitled "Principal-Identity-Domain Based Naming Scheme For Information Centric Networks," which is incorporated herein as if reproduced in its entirety.

P may be used for security purposes. For example, P can be a hash function of producer's public key, e.g., presented as Hash_{PubKey$_{Alice}$}, where Alice is a random name representing a user. I may be a hierarchical structure or a flat ID to represent a service name for service discovery and service late-binding with a locator. For example, if Alice publishes a personal album access service, I could be presented as </Alice/Personal_Album/>. D may be the name of a domain's entity that provides identity resolution service, e.g., the name of a gateway that provides a resolution service to resolve a service identity to a globally known locator identity. For example, if Alice publishes a service from a network belonging to ATT, then D may be presented as /ATT/SRS/, where SRS stands for service resolution system. Now the whole name for Alice's personal album access service can be represented in <P:I:D> form:

<Hash_{PubKey$_{Alice}$}>:</Alice/Personal_Album>:</ATT/SRS/>.

When a new service is published, an SRN in the service domain may notify a SRS about a global locator for the service. Thereby, when a consumer resolves a service, the service may be resolved to have the appropriate D. Recall that if a SPM is deployed in a per-domain manner, identification of the SPM may be used as the D in the <P:I:D> name scheme.

An SRN (e.g., the SRN 200) may act as a proxy for a user application to process a request and generate a response for the request. Packets sent between UE terminals and local SRNs may comprise SAL UNI packet data units (PDUs), while packets sent between SRNs may be considered SAL NNI packets.

Figure 10A:
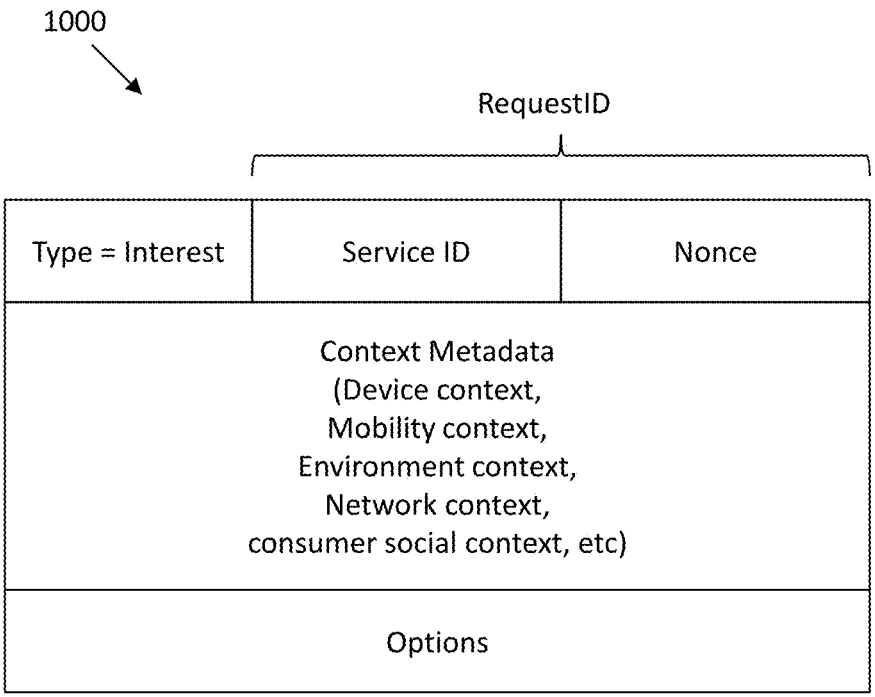
FIG. 10A illustrates an embodiment of a SAL user-network-interface (UNI) interest packet.

FIG. 10A illustrates an embodiment of a SAL UNI interest packet 1000, which may be sent from a UE to an SRN. A type field indicates the packet is an interest packet. A service ID may identify the service requested by the consumer. A nonce may be a random number appended to the service ID to form a unique Request ID. Contextual information of the consumer may be stored as context metadata in a SAL header of the interest packet 1000. Context metadata may comprise device context, mobility context, environment context, network context, consumer social context, etc.

Figure 10B:
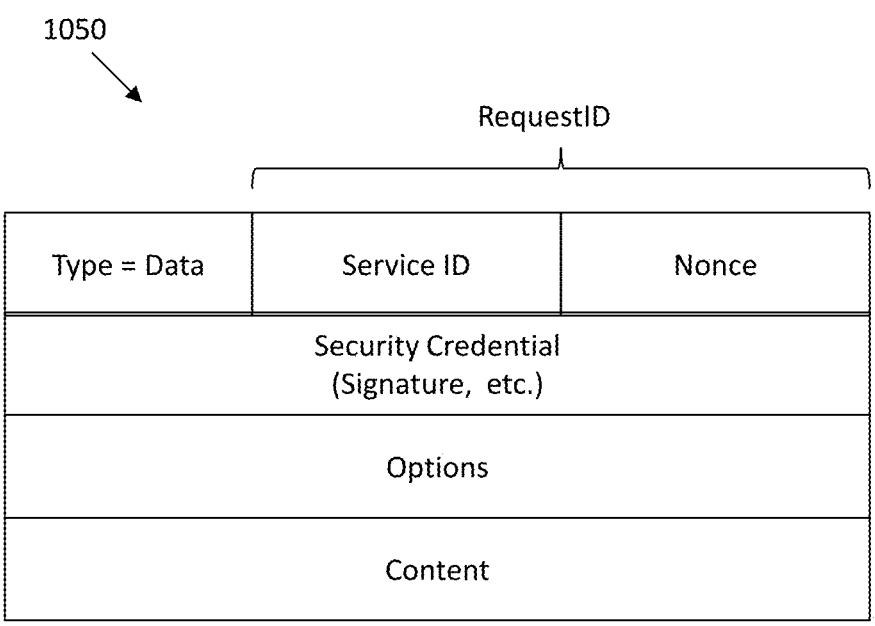
FIG. 10B illustrates an embodiment of a SAL UNI data packet.

FIG. 10B illustrates an embodiment of a SAL UNI data packet 1050, which may be sent from an SRN to a UE as a response to the interest packet 1000. A type field indicates the packet is a data packet, e.g., returned to the UE. A service ID may identify the service requested by the consumer. A nonce may be a random number appended to the service ID to form a unique Request ID. The SAL header of the data packet 1050 may include a service producer's signature and related security credential information.

Figure 11A:
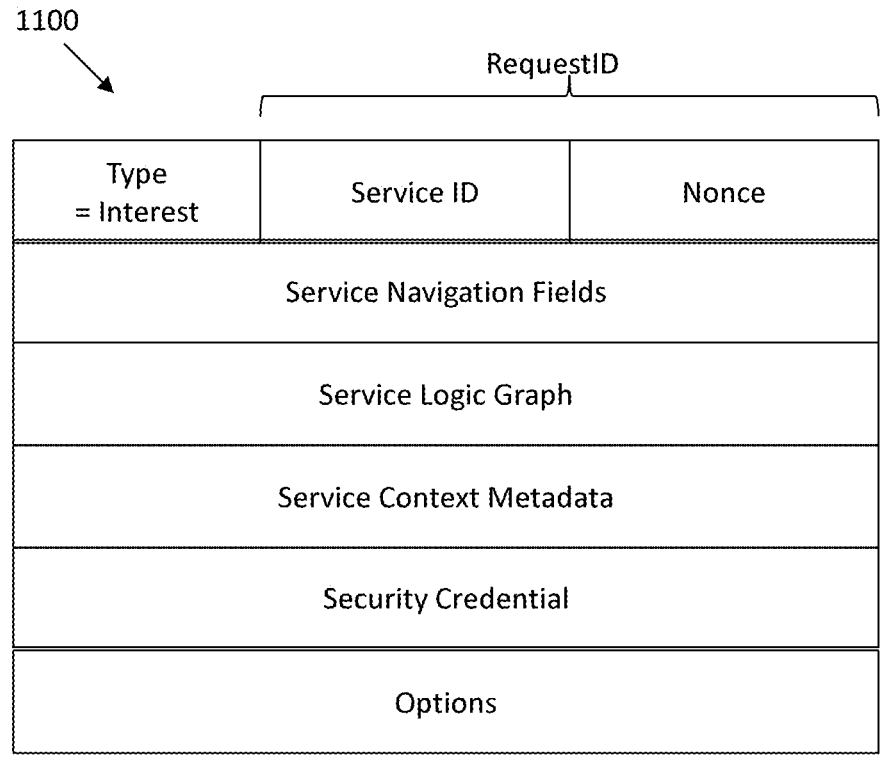
FIG. 11A illustrates an embodiment of a SAL network-network-interface (NNI) interest packet.

FIG. 11A illustrates an embodiment of a SAL NNI interest packet 1100, which may be sent from a first SRN to a second SRN. A type field indicates the packet 1100 is an interest packet. A service ID and a nonce field may be the same as a SAL UNI interest packet (e.g., the packet 1000), in order to indicate that the NNI interest is generated for the same Request ID. In the interest packet 1100, service navigation fields may provide service logic forwarding instructions, which will be further described later. The service logic graph may store overall service logic information, which is derived from service orchestration. The service context metadata may be filtered from the consumer's context information, and may be used for decomposition of a service into tasks.

Figure 11B:
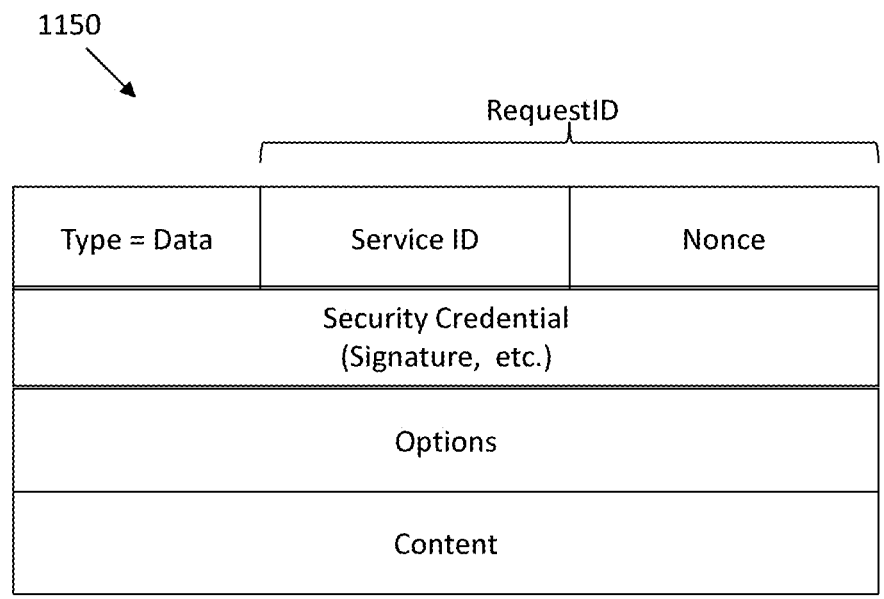
FIG. 11B illustrates an embodiment of a SAL NNI data packet.

FIG. 11B illustrates an embodiment of a SAL NNI data packet 1150, which may be sent from a second SRN to a first SRN. A type field indicates the packet 1150 is a data packet. A service ID and a nonce field may be the same as a SAL UNI data packet (e.g., the packet 1050), in order to indicate that the NNI interest is generated for the same Request ID. The SAL header of the data packet 1150 may include a service producer's signature and related security credential information.

When it comes to the mobility management of service application and data, from a consumer's perspective, it may be desired for a service to be reachable from anywhere. Therefore, one of the motivations in this disclosure is to introduce a new definition: Network-As-A-Datacenter, by utilizing in-network caching, computing, and service routing management to deliver services and enrich users' experience. Applications may migrate to any authorized server(s) located at different places, according to the users' requests, content delivery statistics, and/or network resource allocation. The applications may be hosted by content routers or a regular pool of servers. As an example, suppose that a service domain only provides a video downloading service but doesn't provide a transcoding service. Further suppose that there is a large number of service requests arriving at this service domain with both video downloading and video transcoding interest. In this case, the ICN-based SCN framework may migrate, from elsewhere, an authorized transcoding service as a localized service, thereby reducing transition latency between two services.

ICN may use name-based routing to decouple content identity from its actual location, which may allow for efficient delivery of static content published in advance. An objective of this disclosure is to generate contextualized content using the service delivery capability of an ICN-based SCN framework. As mentioned previously, a two-level service decomposition approach may be used to adapt the requested service considering user's context. Further, a service routing mechanism may be designed to navigate services as a result of decomposition.

For consumer request decomposition, a SCN framework may process a service interest sent from a consumer taking into account various contextual factors such as affiliation, location, mobility context, device context, and personal or social context of the consumer. These contextual properties may be interpreted and broken into multiple services.

Once an original service request is decomposed into multiple services, each individual service may be further decomposed based on several factors such as network attachment status or the server's status and the consumer's contextual information. Note that the server's status may refer to a bandwidth and/or a throughput at the server. A service may comprise a plurality of instances, which are distributed at multiple servers but provide the same service. Therefore, an interest to a particular service may be decomposed into multiple tasks.

Figure 12:
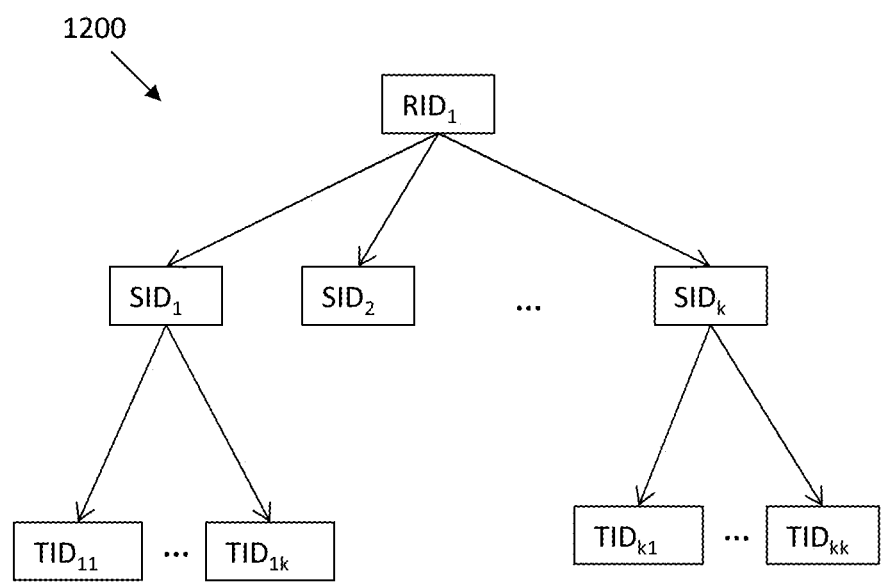
FIG. 12 illustrates an embodiment of a two-level service request decomposition scheme.

FIG. 12 illustrates an embodiment of a two-level service request decomposition scheme 1200, which is presented as a tree-like structure. Note that a request ID (denoted as $RID_1$) may be considered equivalent to a service identity that a consumer originally requests, with a nonce, to uniquely represent the original service request from the consumer. A service ID (denoted as $SID_1, SID_2, \ldots, SID_k$) may be a unique name that indicates a particular service.

Further, a task ID (denoted as $TID_{11}$ to $TID_{kk}$) may uniquely indicate a service instance that is decomposed from an individual service. A task ID may be considered equivalent to a specific service ID with a nonce, and task IDs may be used by differentiate tasks processing the same service. As shown in FIG. 12, on a first level a request is decomposed into multiple services, and on a second level, each of some or all of the services is decomposed into multiple tasks.

Figure 13:
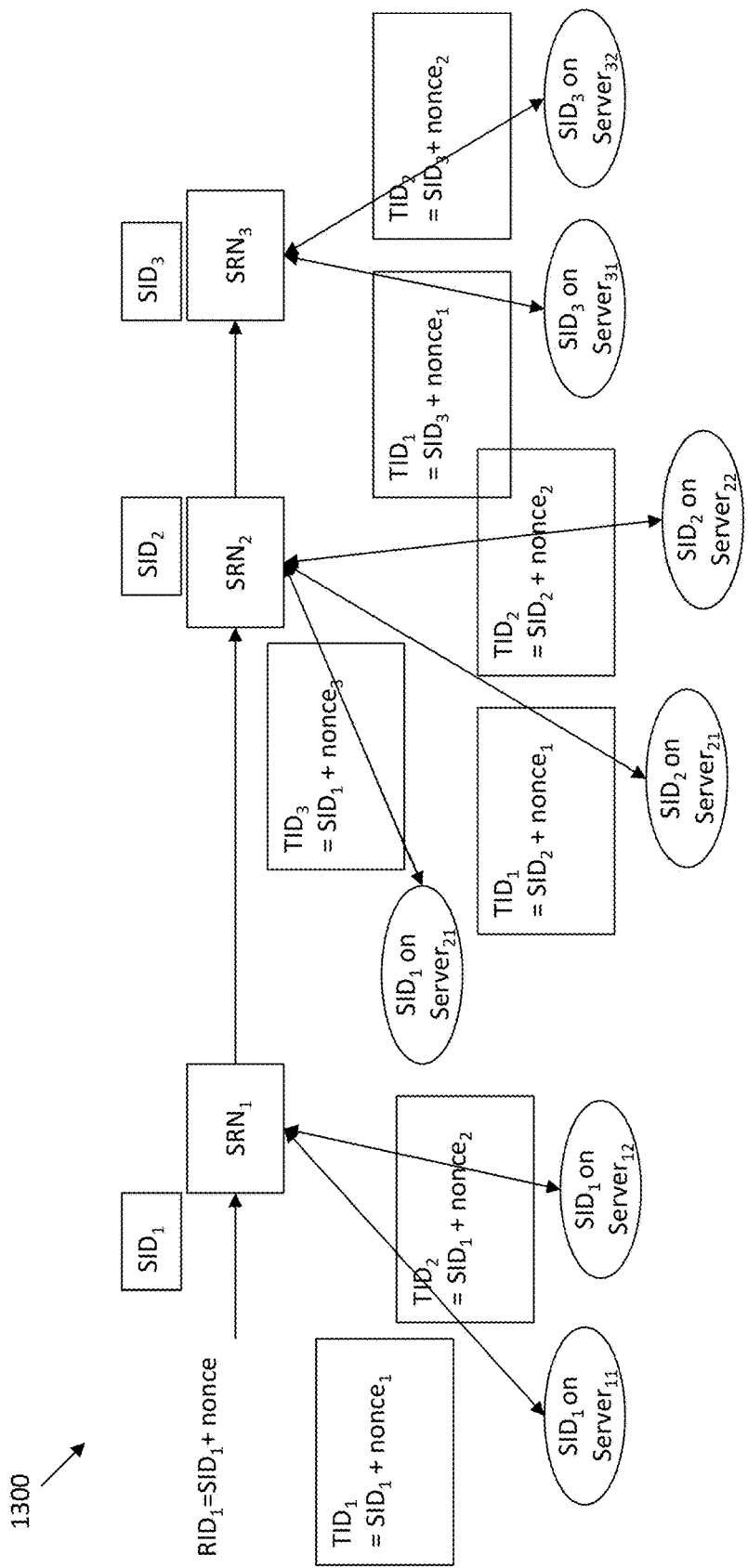
FIG. 13 illustrates an embodiment of a service orchestration scheme.

FIG. 13 illustrates an embodiment of a service orchestration scheme 1300, in which $SRN_1$, $SRN_2$ and $SRN_3$ may belong to three different service domains interconnecting each other. Assume that each of the domains has a pool of servers, and that a consumer resides in the same domain as $SRN_1$. Servers denoted as $Server_{11}$ and $Server_{12}$ are located in the same domain with $SRN_1$ and may both perform $SID_1$. $Server_{21}$ and $Server_{22}$ are located in the same domain with $SRN_2$, wherein $Server_{21}$ may perform $SID_1$ and $Server_{22}$ may perform $SID_1$ and $SID_2$. Further, $Server_{31}$ and $Server_{32}$ are located in the same domain with $SRN_3$ and may both perform $SID_3$.

As shown in FIG. 13, $SRN_1$ may decompose an original $RID_1$ into three specific services identifiable via $SID_1$, $SID_2$, and $SID_3$. Further, by looking up a local Service Profile DB (e.g., the service profile DB 240), $SRN_1$ may find that $SID_1$ is accessible both locally and from $SRN_2$. Accordingly, $SRN_1$ may further decompose $SID_1$ into three tasks identifiable via $TID_1$, $TID_2$, and $TID_3$, where $TID_3$ is implemented through $SRN_2$. In the same manner, $SID_2$ and $SID_3$ may be further decomposed into two tasks once the service interests arrive at $SRN_2$ and $SRN_3$, respectively. In the scheme 1300, the $SRN_1$, $SRN_2$ and $SRN_3$ may form a SCN for $RID_1$. However, the SIDs may need to be properly navigated using service routing management, which will be described next.

Recall that in the two-level service decomposition (e.g., scheme 1200 and 1300), a general service request sent by a consumer may be decomposed into two or more specific services collaborating together to fulfill the consumer's request under his/her context. Moreover, each individual service may be further decomposed into multiple tasks, where each task may process part of the service. How to manage the internal service logic for the consumer's original request and guarantee the proper sequence of service processing may be a significant procedure of service orchestration, thus a service-level routing management mechanism is disclosed herein to achieve this goal.

Note that a task may be considered an instance of a particular service. In other words, if a service is able to be decomposed into multiple tasks by an SRN, the SRN may function as a master node which divides the work to multiple servers. The servers may be considered as worker nodes, e.g., in a MapReduce (a programming model) scenario. Therefore, the tasks may be processed in parallel, and there may be no data transmission between the servers. In the service-level routing management, we consider services with different service IDs which are derived after the first level decomposition (i.e. request to services). Note that these services may be processed in a sequential, parallel, or hybrid manner. Similar to today's routing management, a control plane and a data plane may be used on the service level.

A control plane for service routing is described next. Recall that the decomposition process breaks an original consumer's request (identifiable by a request ID) into discrete services, which may be independent from each other. Therefore, an internal logic may be created to link these services to adapt changes to consumer's contexts.

A service routing control plane may be in charge of creating service level logic graph and construct a service navigation vector. The service navigation vector may comprise or be represented by service navigation fields. Both the service logic graph and the service navigation vector may be carried in the header of a SAL NNI PDU.

A service logic graph may be created by considering several policies that are based on service semantics and contextual properties. Using service semantics or properties, services can be divided into multiple categories or types, including but not limited to: (1) content delivery services (e.g., downloading and/or uploading of video, audio, image, and/or document, etc.); (2) real-time service (e.g., voice over IP (VoIP), video conference, video streaming, etc.); (3) process-oriented services, which may be application for particular data processing (e.g., transcoding, encryption services, load balancing, etc.); and (4) gateway services (e.g., firewall, virtual private network (VPN)).

In operation, an initial request from a consumer application may be decomposed into multiple services according to relevant contextual information carried by an interest packet in the request. The execution of these services may be based on the types of these services. For example, a service request may be decomposed into two services: a content delivery service and a load balance service. Further, the load balance service may not be directly requested from the application, but rather is a context-aware service to improve the content delivery service. In this case, a service logic between the two services is series. More examples are given below to explain the service logic graph.

Figure 14A:
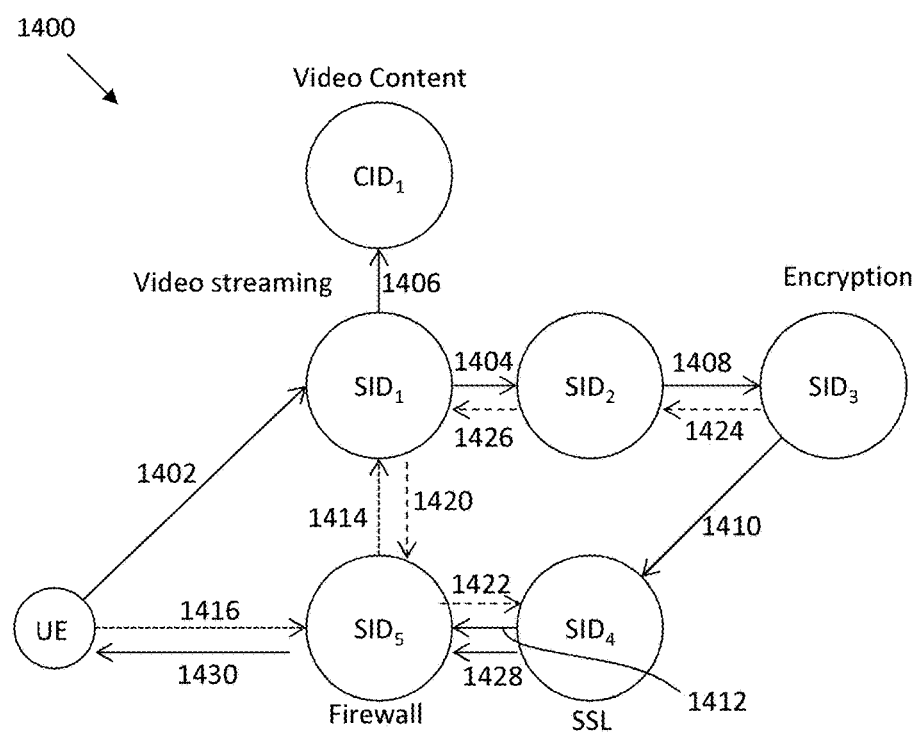
FIG. 14A illustrates an embodiment of a service logic graph.

A service logic graph may present an internal relationship between individual services after decomposition. The service logic graph may show an order in which services need to be invoked to satisfy the original request. FIG. 14A illustrates an embodiment of a service logic graph 1400, which is created based on service semantics and assumes a user scenario of video streaming services. Suppose a consumer uses a mobile device with a low resolution screen, and the consumer uses public WiFi (sometimes slow) as network connectivity. By interpreting the context of the consumer, an SRN may determine that, besides the video streaming request, the consumer needs more process-oriented services (e.g., transcoding and encryption) and gateway services (firewall services) provided at the SRN.

In FIG. 14A, $SID_5$ may be a service that can be directly accessed at the SRN in the UE's domain, while other services may reside in the same domain as $SID_5$ or at different places. These five services may be processed in series, which is presented herein in the form of $SID_1+SID_2+SID_3+SID_4+SID_5$. $SID_1$ may retrieve video content denoted as $CID_1$ before reaching $SID_2$. In FIG. 14A, arrows 1402-1416 indicate interest paths and arrows 1420-1430 indicate data paths. Further, arrows 1402-1412 and 1428-1430 indicate the service level logic, and arrows 1414-1416 and 1420-1426 indicate actual paths taken during ICN transport, which may be different from the service-level logic.

Figure 14B:
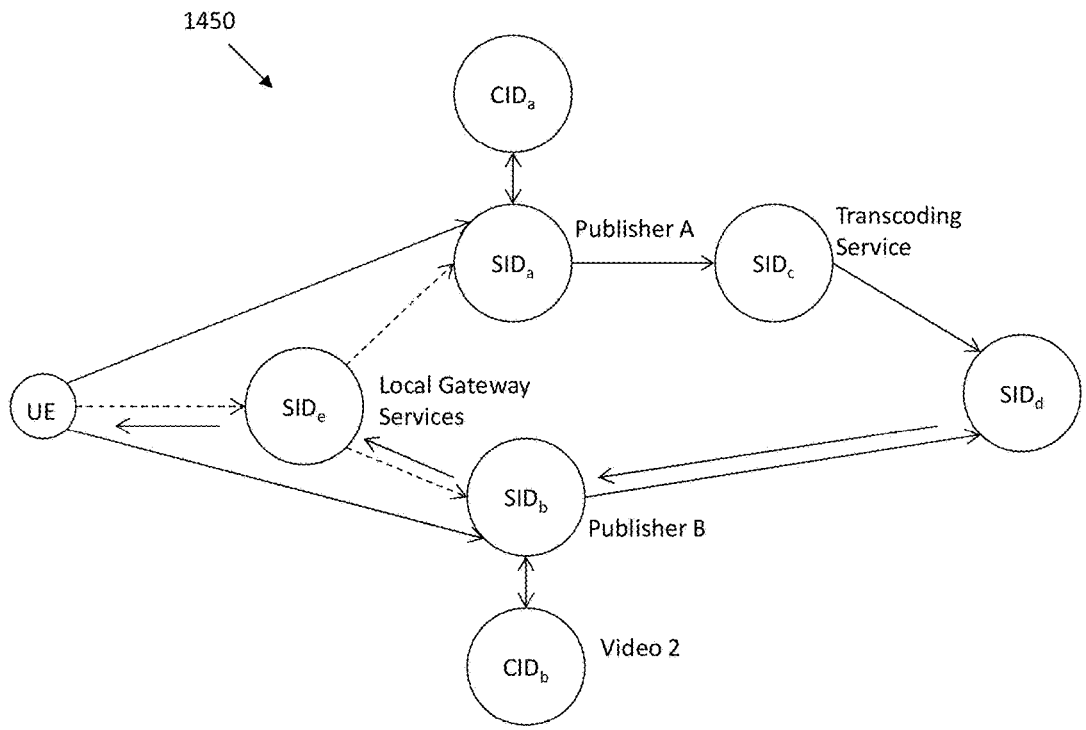
FIG. 14B illustrates another embodiment of a service logic graph.

When decomposing an original service request, some individual services may not be related to each other, thus they can be processed concurrently. FIG. 14B illustrates another embodiment of a service logic graph 1450 reflecting this scenario. For example, a consumer may request a video editing service to join two videos from different producers or publishers (Publisher A and B). Further suppose that, by interpreting the context of the consumer, the original service request may be decomposed into five (may be any other number) individual services: $\{SID_a, SID_b, SID_c, SID_d, SID_e\}$, among which $SID_a$ and $SID_b$ are independent, as they represent two different video producers, and $SID_c$ is a follow-up service to $SID_b$. Accordingly, there may be two parallel service paths before start running service editing service ($SID_d$). The result of service orchestration may be presented as $SID_a+\{SID_b, SID_c\}+SID_d+SID_e$, where "+" indicates series and "{,}" indicates parallel.

In order to correctly direct service forwarding according to the service logic graph, we design a service navigation vector which can be dynamically updated along the service path within a SAL header. In an embodiment, there may be five fields in the service navigation vector:

Request ID: A nonce in the original service request from a consumer;

Source service ID: Names of previously processed services;

Current service ID: The name of the service under processing;

Rule: Indicating how to forward a next hop service, which can be series or parallel;

Next service ID: Services to be processed in the next hop.

Figure 15A:
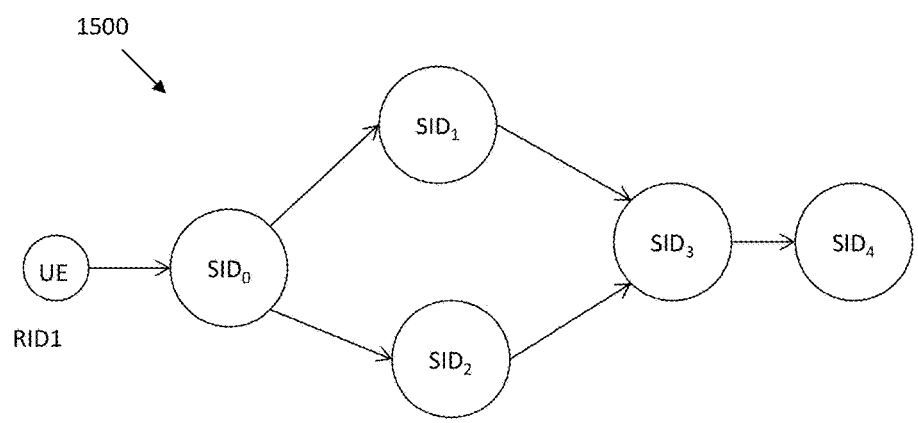
FIG. 15A illustrates an embodiment of a service logic topology.

FIG. 15A illustrates an embodiment of a service logic topology 1500, in which a request RID1 may be decomposed into services executed following the order $SID_0+\{SID_1, SID_2\}+SID_3+SID_4$. Based on the topology 1500, Table 4A-4C show examples of service navigation vectors updated at a first-hop SRN, an intermediate-hop SRN and a last-hop SRN, respectively. It can be seen that the first-hop, intermediate-hop, and last-hop SRNs are configured to fulfill $SID_0$, $SID_3$, and $SID_4$ respectively.

TABLE 4A

An example of updated service navigation vector at a first-hop SRN

| Request ID | Source Service ID | Current Service ID | Rule | Next Service ID |
|---|---|---|---|---|
| $RID_1$ | * | $SID_0$ | Parallel | $SID_1$, $SID_2$ |

TABLE 4B

An example of updated service navigation vector at an intermediate-hop SRN

| Request ID | Source Service ID | Current Service ID | Rule | Next Service ID |
|---|---|---|---|---|
| $RID_1$ | $SID_1$, $SID_2$ | $SID_3$ | Series | $SID_4$ |

TABLE 4C

An example of updated service navigation vector at a last-hop SRN

| Request ID | Source Service ID | Current Service ID | Rule | Next Service ID |
|---|---|---|---|---|
| $RID_1$ | $SID_3$ | $SID_4$ | / | / |

Service navigation vectors, e.g., as shown in Table 4A-4C, may offer a guide on how to forward next service(s). In particular, the field of rule may indicate how to forward next-hop services. If the rule field is set as parallel, it may indicate that the next-hop services are independent, and the corresponding interests can be forwarded at the same time; otherwise, if the rule field is set as series, it may indicate that one service is to be processed after a current service. Further, a Source Service ID field may assist the current SRN to check if previous services are completed when last-hop services are processed in parallel. For instance, in FIG. 15A, $SID_3$ may not begin processing until $SID_1$ and $SID_2$ are both completed.

Figure 15B:
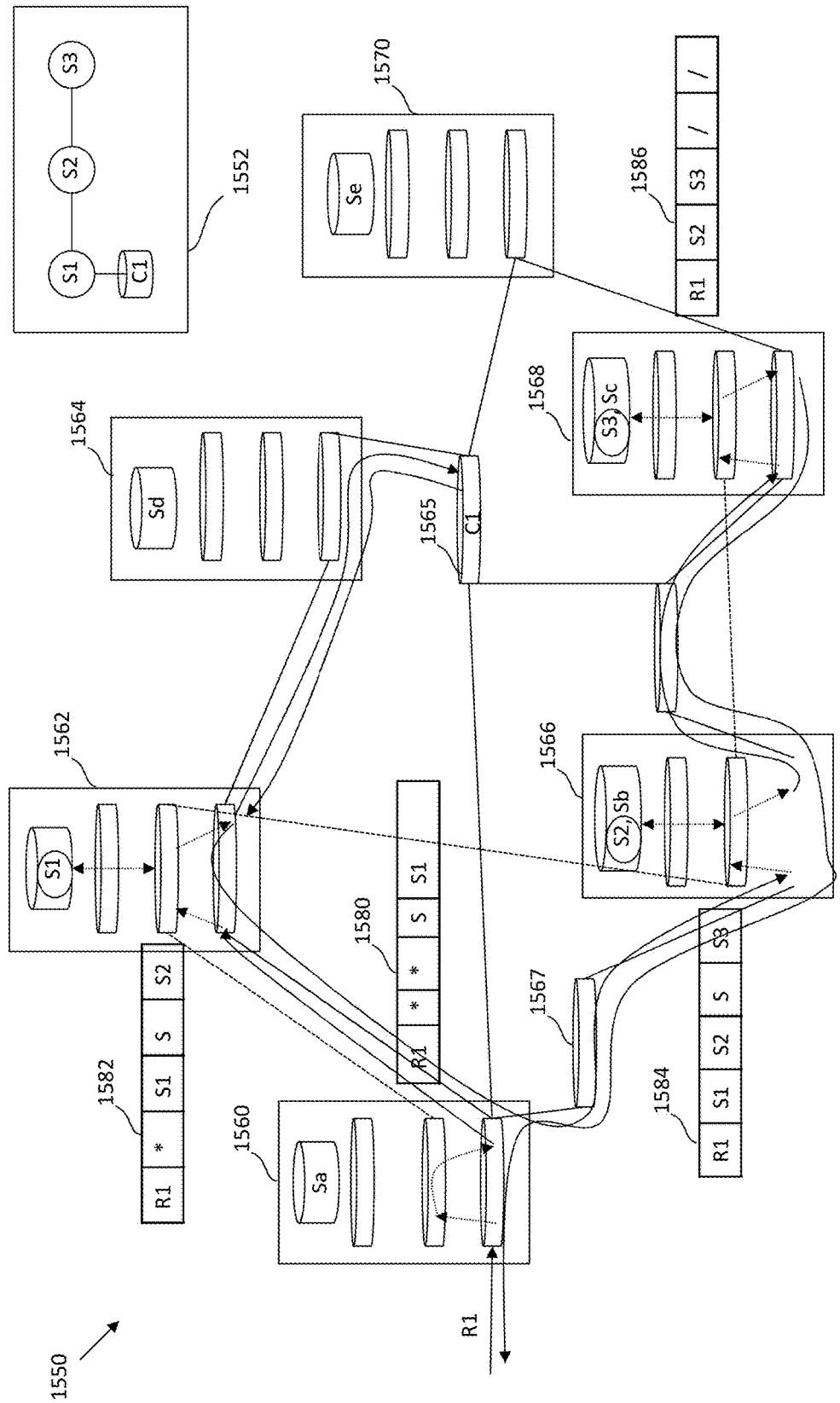
FIG. 15B illustrates an embodiment of a request routing scheme.

FIG. 15B illustrates an embodiment of a request routing scheme 1550, which assumes that a service logic graph 1552 is designed for a service request denoted as R1. The service logic graph 1552 comprises three services denoted as S1, S2, and S3, among which S1 needs to retrieve content denoted as C1. Note that S1, S2, and S3 may belong to a service pool, which may contain other services, such as those denoted as Sa, Sb, Sc, Sd, and Se, that are not needed to process R1. A number of SRNs are included in an ICN-based SCN network, each of which may comprise an application layer, a SAL, and an ICN layer. As shown in FIG. 15B, an SRN 1560 may perform Sa, an SRN 1562 may perform S1, an SRN 1564 may perform Sd, an SRN 1566 may perform S2 and Sb, an SRN 1568 may perform S3 and Sc, and an SRN 1570 may perform Se.

In use, the request R1 may be received by the SRN 1560. According to the service logic graph 1552, the first-hop service S1 may not be performed by the SRN 1560. Thus, a service navigation vector 1580 updated in the SRN 1560 may not need to list any current service. As described earlier, the service navigation vector 1580 may set R1 as its request ID, the rule as series, and S1 as its next service ID. The SRN 1560 forwards the request R1 to the SRN 1562, which may perform service S1 according to the service logic graph 1552. Further, the SRN 1562 may generate an updated service navigation vector 1582, which may set S1 as its current service ID, series rule, and S2 as its next service ID. Next, the request may be forwarded to the SRN 1564, which may retrieve content for the request from a network node 1565.

Further, the request may be forwarded to the SRN 1566 via the SRN 1562, the SRN 1560, and a network node 1567. Note that, depending on the architecture of the ICN network, the request may take any other route to reach the SRN 1566, where S2 may be performed for the request. In addition, the SRN 1566 may generate an updated service navigation vector 1584, which may set S1 as its source service ID, S2 as its current service ID, series rule, and S3 as its next service ID.

Next, the request may be forwarded to the SRN 1568, where S3 may be performed and an updated service navigation vector 1586 may be generated. Since the SRN 1568 is the last-hop SRN, the service navigation vector 1586 may set S2 as its source service ID, S3 as its current service ID. The rule and next service ID may no longer need to be set. After completing all services for the request R1, returned data may be delivered back to the requester, e.g., via the SRN 1566, the network node 1567, and the SRN 1560. One of ordinary skill in the art will recognize that the delivery paths for service interest, content, and returned data may vary depending on the service logic graph and architecture of the ICN network. Further, although the request routing scheme 1500 uses the series rule as an example, it should be understood that a routing scheme using parallel rule or a combination of series and parallel rules may be similarly implemented.

Corresponding to the control plane described above, a data plane for service routing may process a service logic as required by the service navigation vector. The data plane may further update a service navigation vector at each SRN hop, if necessary.

Regarding a service returned data path, sometimes it may not be an optimal solution to take the reverse of the interest delivery path, e.g., when the requested data is not sharable or cacheable. In this case, there may be two options of configuring the path. A first option may resolve a root service ID and use the first hop SRN's location ID as the destination when delivering the returned service data with a shortest path, when the data is not sharable. A second option may send a response back following a service logic graph. At the points where there may be multiple choices due to services in parallel, the SRN may use a source service ID, which is optimal from its respect. A penultimate service ID from which the first interest was sent may be selected as the path for returned data.

Next to describe are embodiments to manage device mobility in an ICN-based SCN framework, where a device may belong to a service consumer, a service producer, or both. In the interest of clarity, descriptions will focus on device mobility management from the perspective of a service producer, as mobility from the perspective of a consumer may be handled by the native ICN framework.

Recall that G-SAP is part of the ICN-based SCN framework as a generic service access platform for any service domain. Intra G-SAP and inter G-SAP mobility management may correspond to intra-domain and inter-domain service producer mobility management, respectively.

In intra G-SAP mobility management may refer to inter network access technology mobility management within one service domain. In this case, service producer may move between access networks. An H-AP (e.g., the H-AP 500) may work as a service connectivity anchor point and a network connectivity anchor point to handoff interest/data between PoAs. Further, mobility may be transparent to the public internet in terms of the binding of service identity and location.

On the other hand, in inter G-SAP mobility management, service producer may temporarily or permanently move between two different service domains. Two H-APs may coordinate with each other about packet handover during the process of mobility management. If a service producer permanently moves to a different domain, it may republish its service. Accordingly, the binding of the service ID and its global locator may be updated.

Note that an H-AP may manage multiple PoAs, and a PoA may manage multiple users and associated UEs that may provide the same services. For example, a user may publish his personal album access service through both his smartphone and tablet, but these devices may be attached to different network connectivity provided by different ISPs. In this case, to support service producer mobility, there may be several levels of late-binding to be considered. First, a lowest level may be to bind the service to a proper mobile device. In practice, a producer may be expected to publish one service on multiple mobile devices that may be synchronized to offer the same service access. For instance, a smartphone and a tablet may both provide personal album access at the same time. Second, a higher level may be to bind a service at the radio access interfaces. A service may be accessed from two different radio access networks, e.g., via LTE and WiFi from the same ISP. In this case, it may be inefficient to bi-cast service interests to both networks all the time. Third, a top level may be to bind a service at an H-AP which is at the ISP domain level. A service may be accessible through two radio access networks from two different ISP domains. For example, a smartphone may be registered with an LTE network belonging to AT&T, but may also connect to a WiFi network belonging to COMCAST at home. Thus, when a consumer sends an interest, the framework needs to decide where to send the interest.

To achieve a three-level service identity and location late-binding relationships, a late-binding tree is disclosed herein. ICN name-based routing may route a service to a proper destination based on the tree structure. In the scope of public Internet, customers can learn the global unique service identity in the form of <P:I:D>. Next, with service name-locator resolution, a global locator name may be returned for name-based routing on the ICN layer. The global locator name may be the name of the ISP where the service is published and may include the name of an SRN. In turn, the SRN may change a routing prefix into the name of an H-AP. Next, when the service interest reaches ISP's H-AP, a local late-binding may return the radio access interfaces of the service, and a new routable name may be attached to the service interest for routing purposes. The locator may be the ICN-enabled gateway of the radio access network, e.g., an ICN-enabled serving gateway (S-GW) for an LTE network. Further, the bottom level of the late-binding may be to bind the service with a particular device.

Figure 16A:
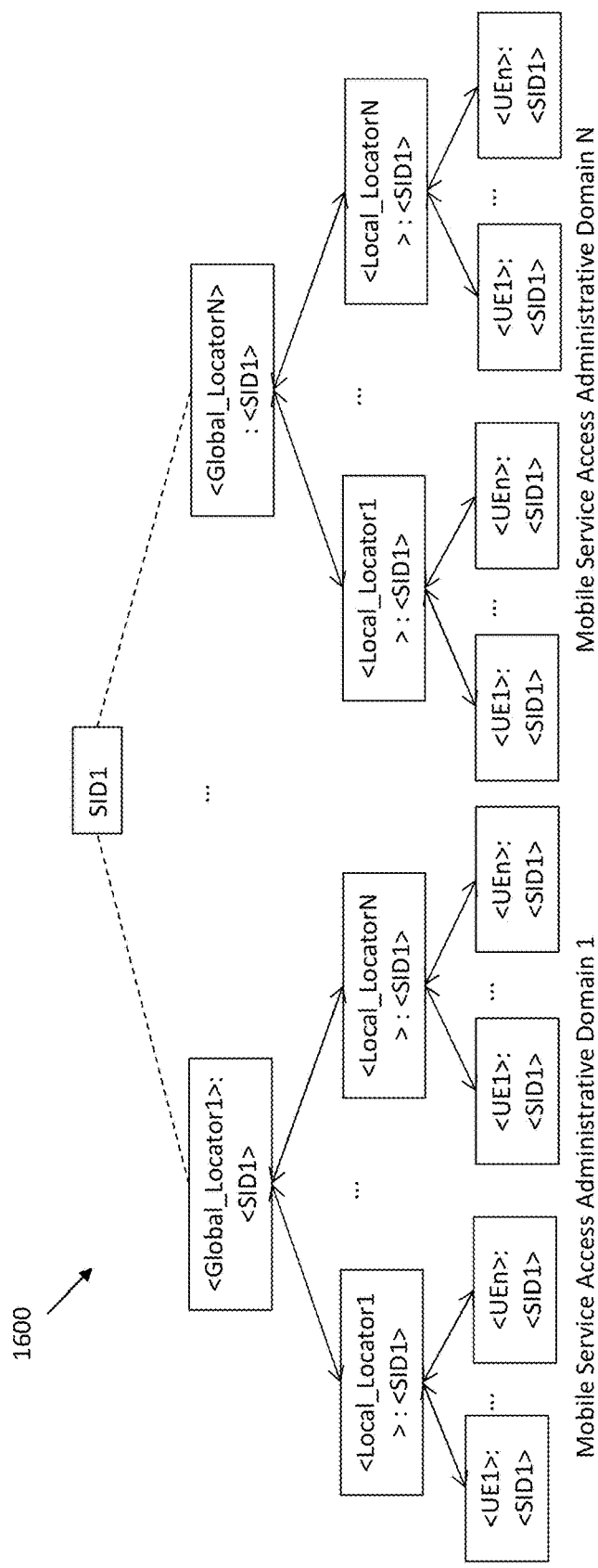
FIG. 16A illustrates an embodiment of a late-binding tree for a service.

FIG. 16A illustrates an embodiment of a late-binding tree 1600 for a service with identity $SID_1$. In the public Internet, a service may be discovered with its identity $SID_1$, and a resolution service may find its global locator as a routing prefix in the ICN network. As shown in FIG. 16A, <global_locator>:<$SID_1$> represents a first level of late-binding. In a disclosed framework (e.g., the framework 100), a global_locator may refer to an SRN within an ISP domain (e.g., /ATT/SRN/). The SRN may find the correct H-AP where the service is published, change the prefix into H-AP, and forward the interest to the H-AP.

In the H-AP, a second-level of late-binding may be done to bind the service with a proper radio access network. In the second level of the tree 1600, the local_locator may refer to a PoA. Considering that the service may be provided by any mobile device, a third and last level of late-binding may be done in the PoA, which may forward the interest to a proper UE. As a result, the late-binding tree 1600 may enable service transparency to the public Internet.

To construct a service late-binding tree, a SAST may be used to track where a service is published. Further, an MST may be designed to help determine the path to an actual location of the service by traversing the service late-binding tree. Before going to detail on how to manage service mobility in terms of device mobility, a general process of network registering a mobile device and a service publishing process from a mobile device will be described first.

Figure 16B:
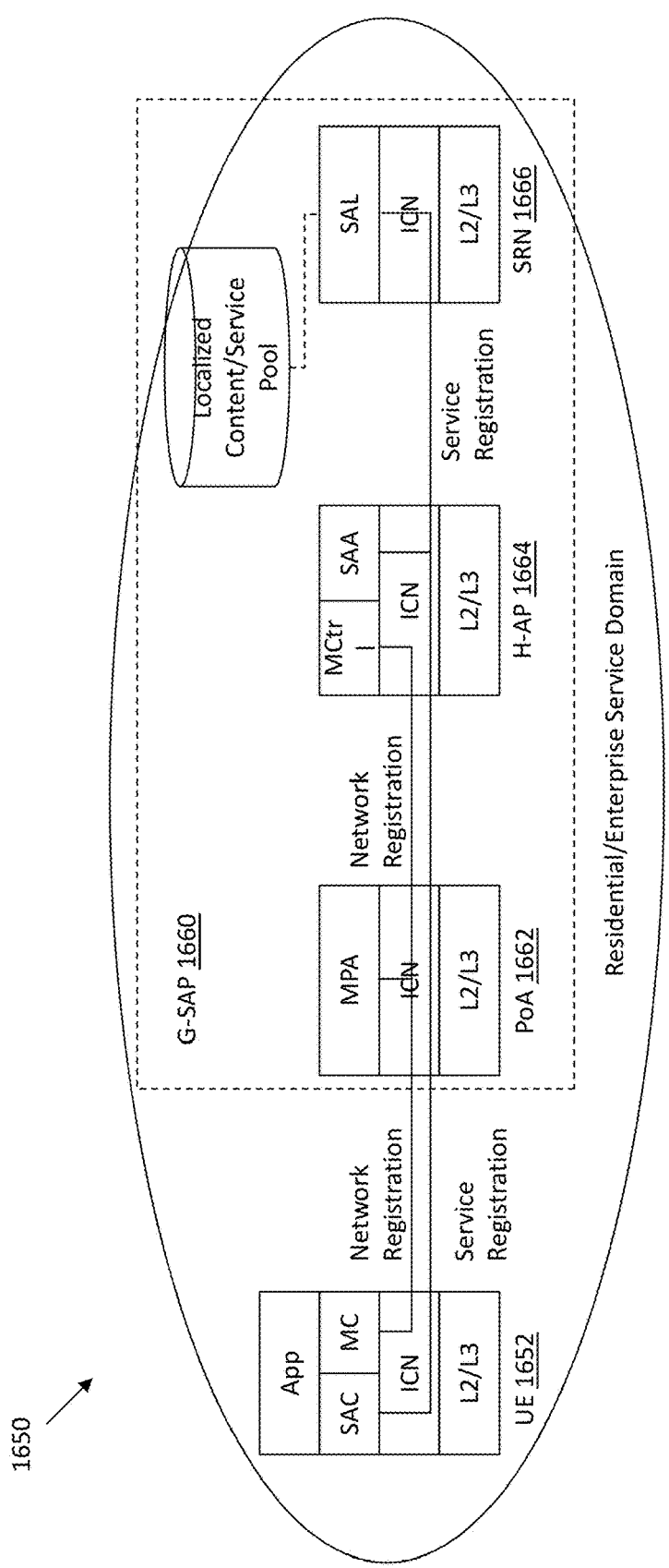
FIG. 16B illustrates an embodiment of a service domain.
Figure 17A:
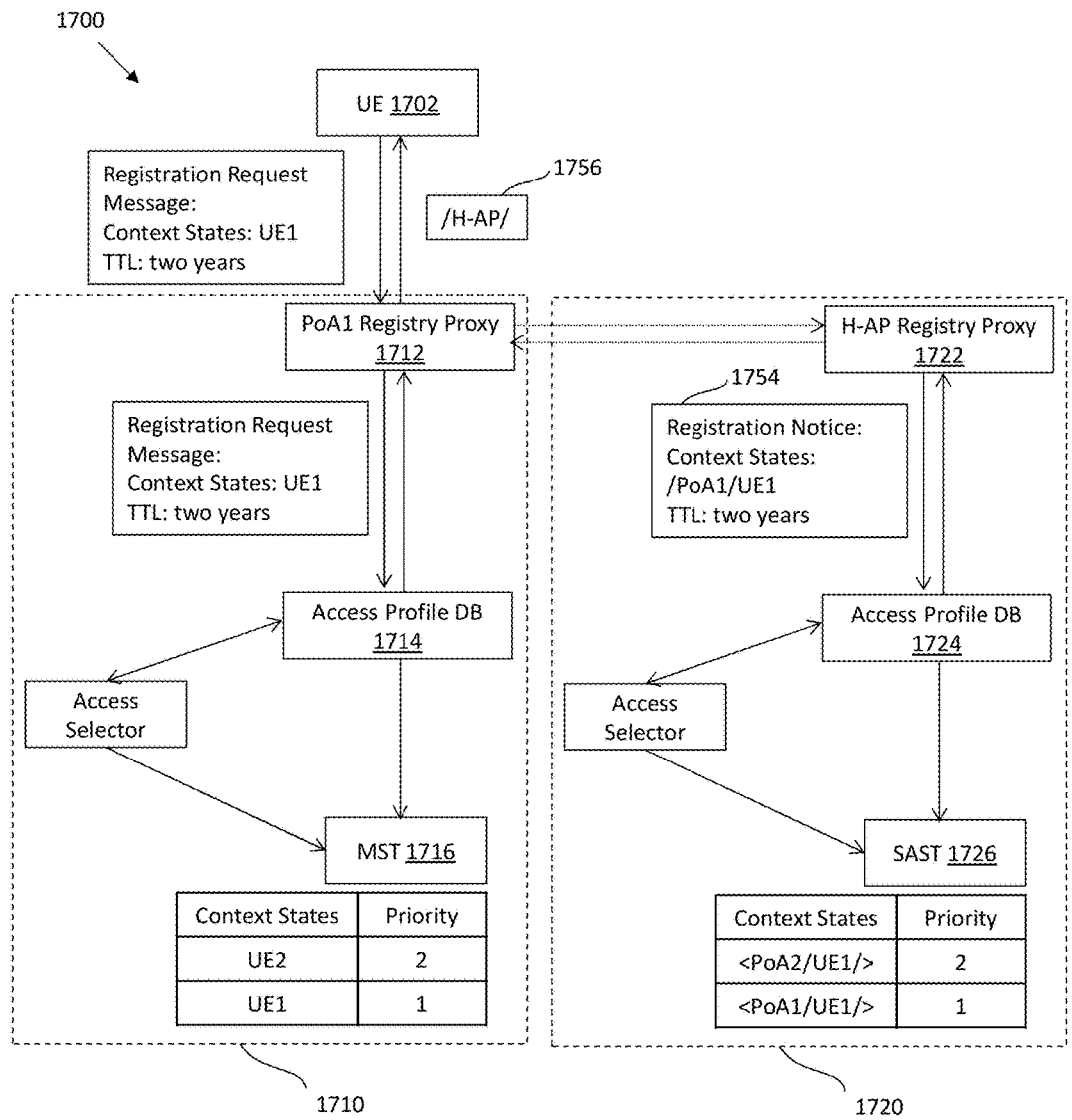
FIG. 17A illustrates an embodiment of a UE registration process.

FIG. 16B illustrates an embodiment of a service domain 1650, in which network registration and service registration may be performed to handle heterogeneous mobility. The service domain 1650 may comprise a UE 1652 and a G-SAP 1660, which in turn may comprise a PoA 1662, an H-AP 1664, and an SRN 1666. Functional modules of each of these devices have been described previously. As shown in FIG. 16B, the UE 1652 may be registered in the H-AP 1664 before providing any service. In network registration of the UE 1652, the PoA 1662 may work as an agent between the UE 1652 and the H-AP 1664 to process network attachment. Further, in registration of a service from a service pool in the domain 1650, the H-AP 1664 may work as an agent between the UE 1664 and the SRN 1666 to process service publish messages. Note that service registration may or may not be done at the same time with network registration FIG. 17A illustrates an embodiment of a UE registration process 1700. Suppose, for example, a user named Alice plans to publish her personal album access service with attributes ($SID_1$=Hash_{PubKey$_{Alice}$}:/Alice/Personal_Album/:/ATT/SRS) from her smartphone (shown as UE 1702)

through an AT&T LTE network. Before publishing a service, the UE 1702 may complete network connectivity registration using the process 1700, and a PoA 1710 may serve as a proxy to register the UE 1702 at an H-AP 1720 (at is denoted as @ in drawings).

Alice would like to connect her smartphone to the AT&T LTE network. Thus, a MA (e.g., the MA 720) in the UE 1702 may first send a registration request message 1752 to a network registry proxy 1712 in the PoA 1710 of the LTE network. The PoA 1710 may update its access profile DB 1714 after receiving the registration request message 1752. The PoA 1710 may further update its MST 1716 with the smartphone's access context states. In the MST 1716, the priority for a new registered UE may be set to a highest priority by default, e.g., with value of 1.

The PoA 1710 may also send a registration notice or notification message 1754 about the registration of Alice's smartphone to a network registry manager or proxy 1722 in the H-AP 1720, where the PoA$_1$ has already registered with. The H-AP may then update its access profile DB 1724 and its SAST 1726 with the UE's access context states. Note that, in the SAST 1726, an access context state entry may have the names of both the PoA 1710 and the UE 1702. When the PoA 1710 gets a response from the H-AP 1720, the PoA 1710 may send an acknowledgement response message 1756 to the UE 1702 with an H-AP prefix (denoted as /H-AP/).

Figure 17B:
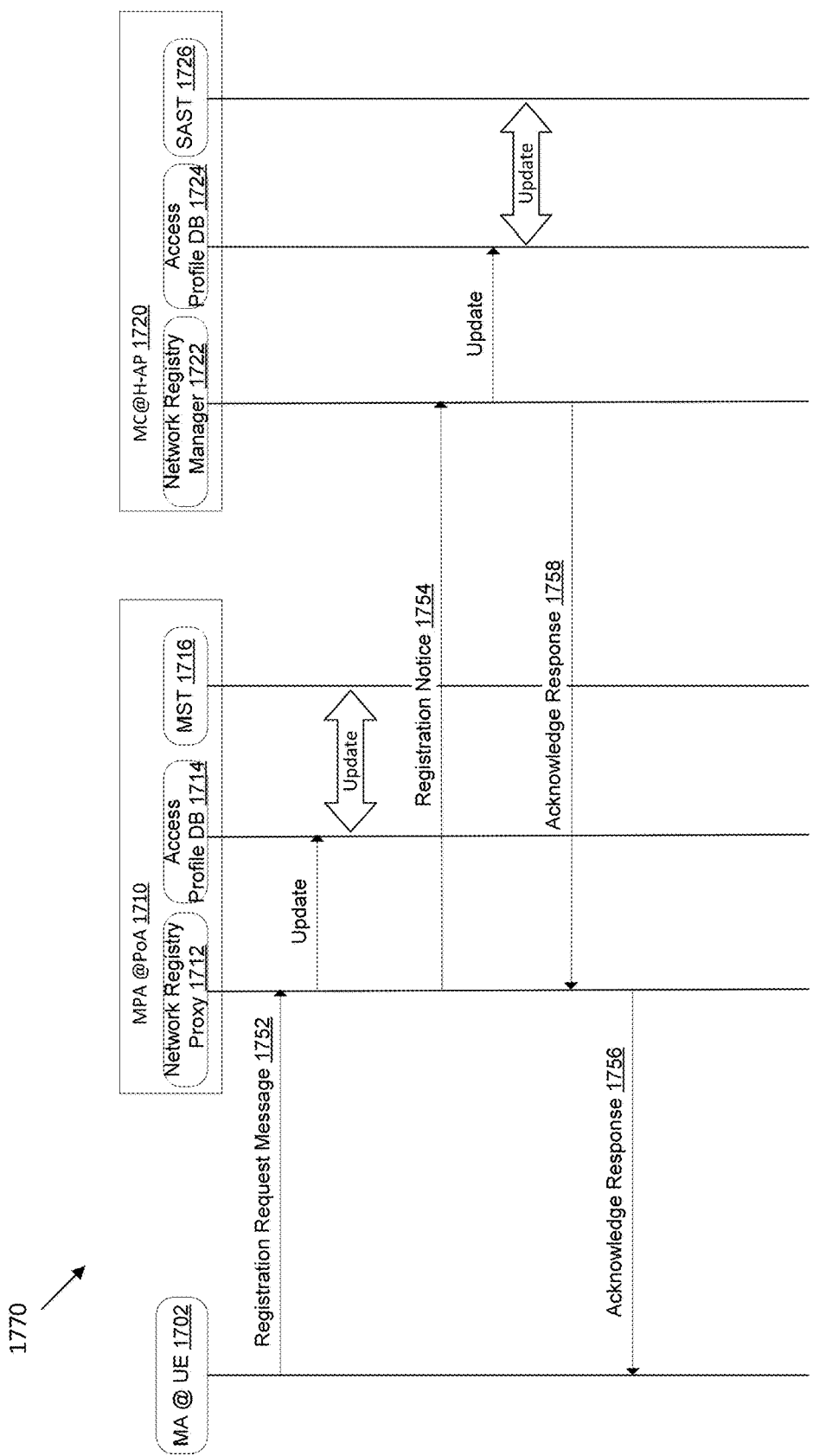
FIG. 17B illustrates an embodiment of a work flow for the UE registration process.

FIG. 17B illustrates an embodiment of a work flow 1770 to represent the UE bootstrap process 1700 in the form of a message exchange protocol. As shown in FIG. 17B, a MA in the UE 1702 may first send a registration request message 1752 to the network registry proxy 1712. The PoA 1710 may update its access profile DB 1714 after receiving the registration request message 1752. The PoA 1710 may further update its MST 1716 with the smartphone's access context states. In the MST 1716, the priority for a new registered UE may be set to a highest priority by default, e.g., with value of 1. Next, the PoA 1710 may send a registration notice 1754 about the registration of UE 1702 to the network registry manager 1722 in the H-AP 1720, where the PoA 1710 has already registered with. The H-AP 1720 may then update its access profile DB 1724 and its SAST 1726 with the UE's access context states. Note that, in the SAST 1726, an access context state entry may have the names of both the PoA 1710 and the UE 1702. When the PoA 1710 gets an acknowledgement response 1758 from the H-AP 1720, it may send the acknowledgement response message 1756 to the UE 1702 with an H-AP prefix.

Figure 18A:
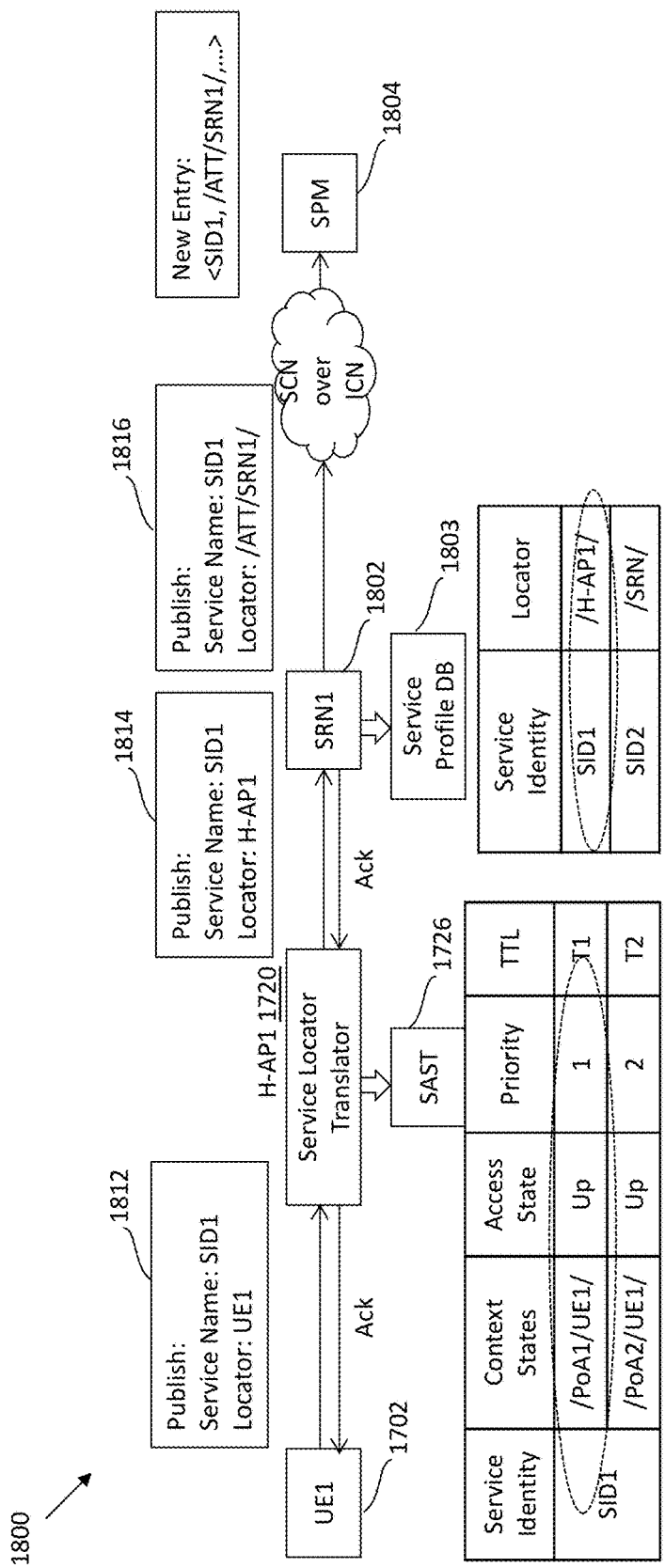
FIG. 18A illustrates an embodiment of a service publishing process from a UE.
Figure 18B:
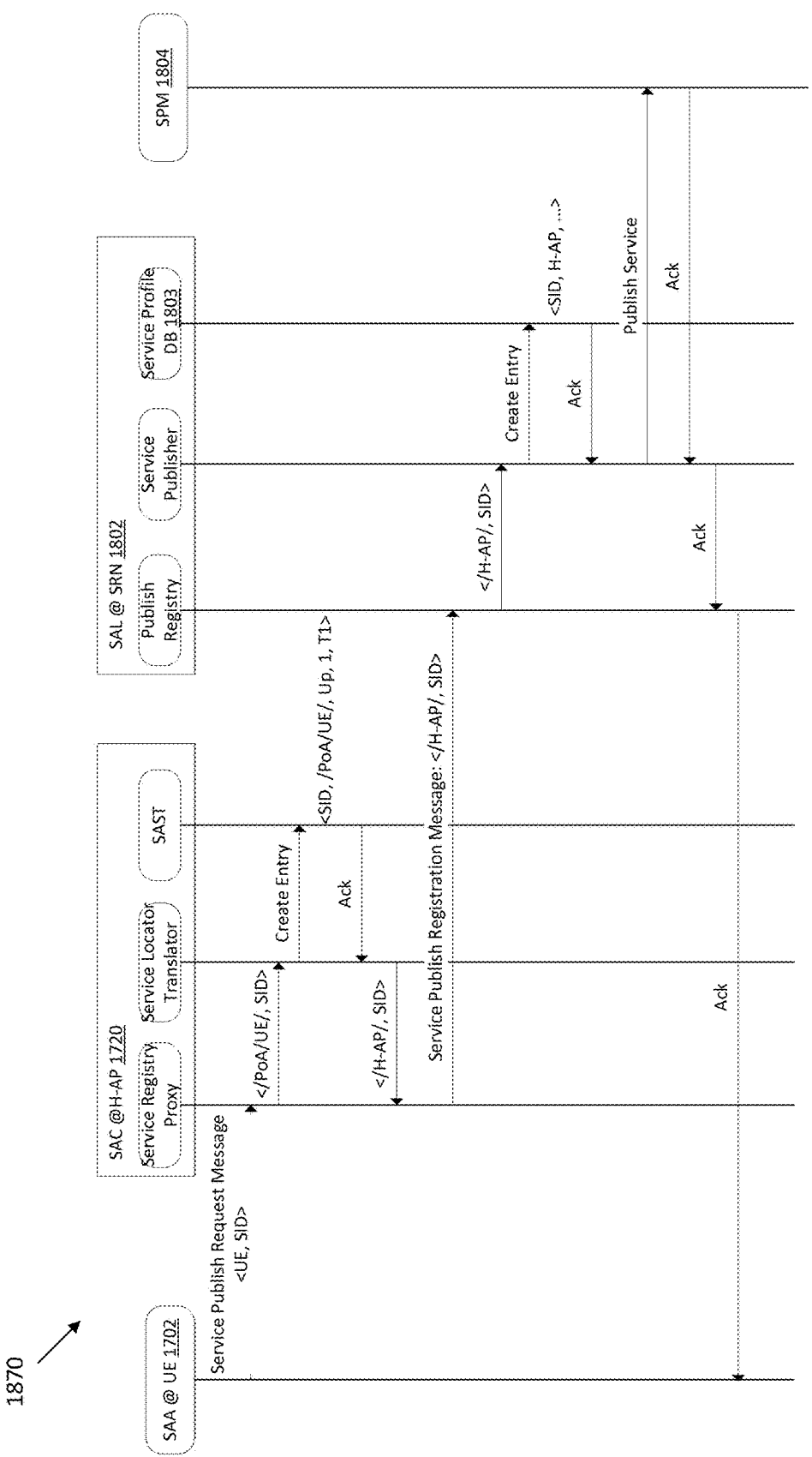
FIG. 18B illustrates a work flow of a service publishing process.

FIG. 18A illustrates an embodiment of a service publishing process 1800 from the UE 1702, and FIG. 18B illustrates a work flow 1870 of the process 1800. Assume that the UE 1702 has already registered network connectivity at the H-AP 1720. When a service is published at UE 1702, the UE 1702 may send a publishing message 1812 to the H-AP 1720, and the publishing message 1812 may comprise a pre-defined priority value and a locator being the UE 1702. Upon receiving the publishing message 1812, the H-AP 1720 may insert a new entry into the SAST 1726, and update the publishing message 1812 with new locator information, which may use the H-AP 1720 instead of the UE 1702, thereby generating an updated publishing message 1814.

Then, the H-AP 1720 may send the updated publishing message 1814 to an SRN 1802, which may further update the service locator as the SRN 1802, thereby generating an updated publishing message 1816. Note that the service locator may be a routable name of the entity that provides the service in the framework. The SRN 1802 may then publish the service to a SPM 1804 via an ICN network. Note that once the publishing message 1814 arrives at the SRN 1802, the SRN 1802 may update its service profile DB 1803 with the name of the new service and locator H-AP 1720. The service profile DB 1803 may be used to find where a service is hosted within a domain wherein the SRN 1802 resides. Note that other messages, such as acknowledgements, although not elaborated, may be exchanged between the network devices, as one of ordinary skill in the art will recognize.

Figure 19A:
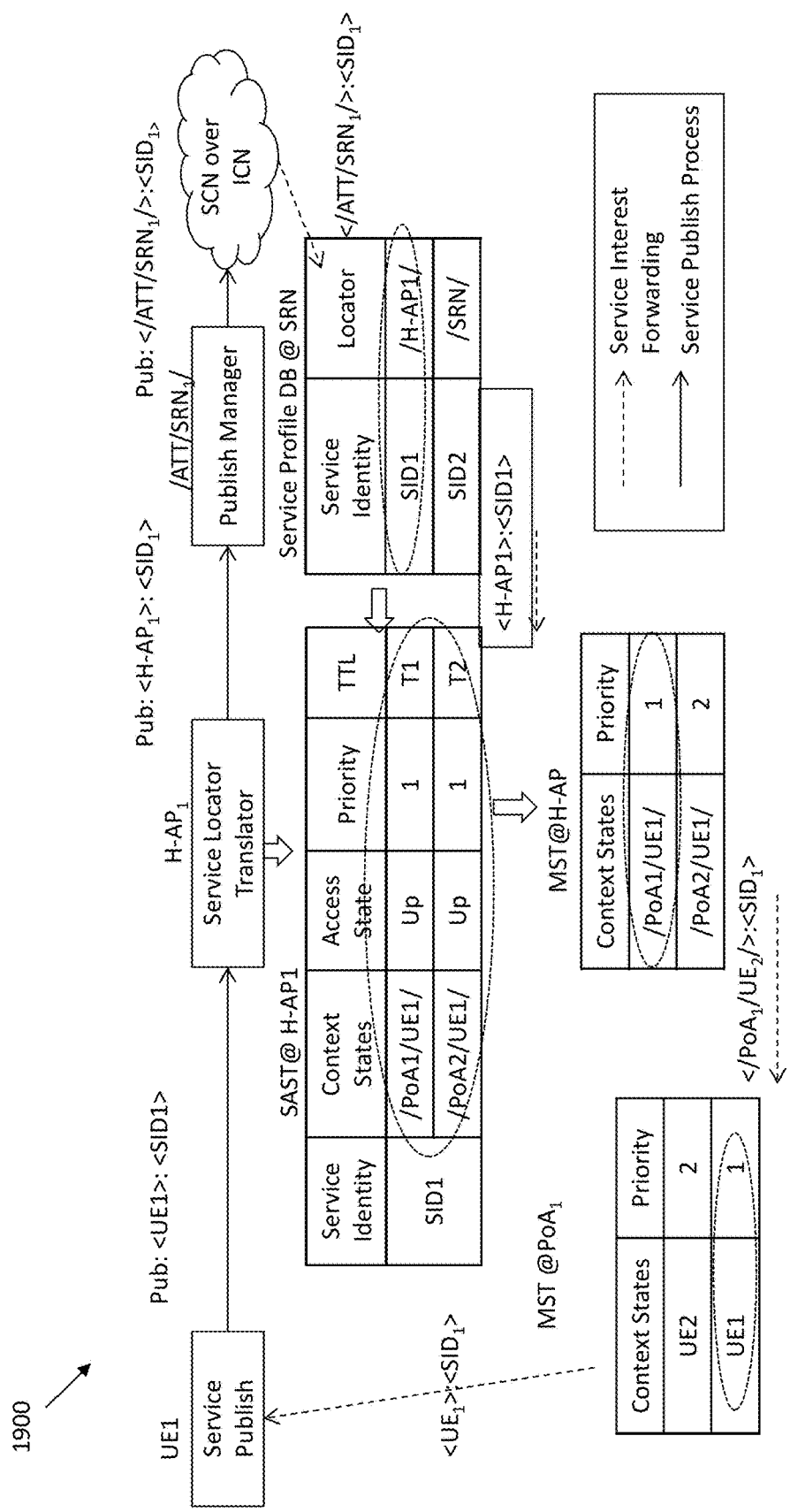
FIG. 19A illustrates an embodiment of a work flow for routing an arrived service interest from an SRN to a mobile device.

A service may be locally forwarded. FIG. 19A illustrates an embodiment of a work flow 1900 for routing an arrived service interest from an SRN$_1$ to a mobile device. An ICN core network may forward the service interest of SID$_1$ from the consumer to the SRN denoted as "/ATT/SRN$_1$/". The SRN$_1$ may process the service interest and query its service profile DB to find the locator for SID$_1$. In the example shown in FIG. 19A, SID$_1$ is published by H-AP$_1$, so SRN$_1$ may change the routing prefix to H-AP$_1$ and then forward the interest. With the ICN transport, the interest may arrive at H-AP$_1$, where a service engine may first look up a corresponding service name in a SAST. By checking the SAST, the Service Engine may find out that SID$_1$ is published from both /PoA$_1$/UE$_1$/ and /PoA$_2$/UE$_1$/, and that they have the same priority. In this case, the H-AP$_1$ may check its MST and find that /PoA$_1$/UE$_1$/ has a higher priority than /PoA$_2$/UE$_1$/, so the H-AP$_1$ may update the routing prefix with /PoA$_1$/UE$_1$/ for the service interest. Then, the H-AP$_1$ may forward the service interest to PoA$_1$, which in turn forwards it to UE$_1$.

Figure 19B:
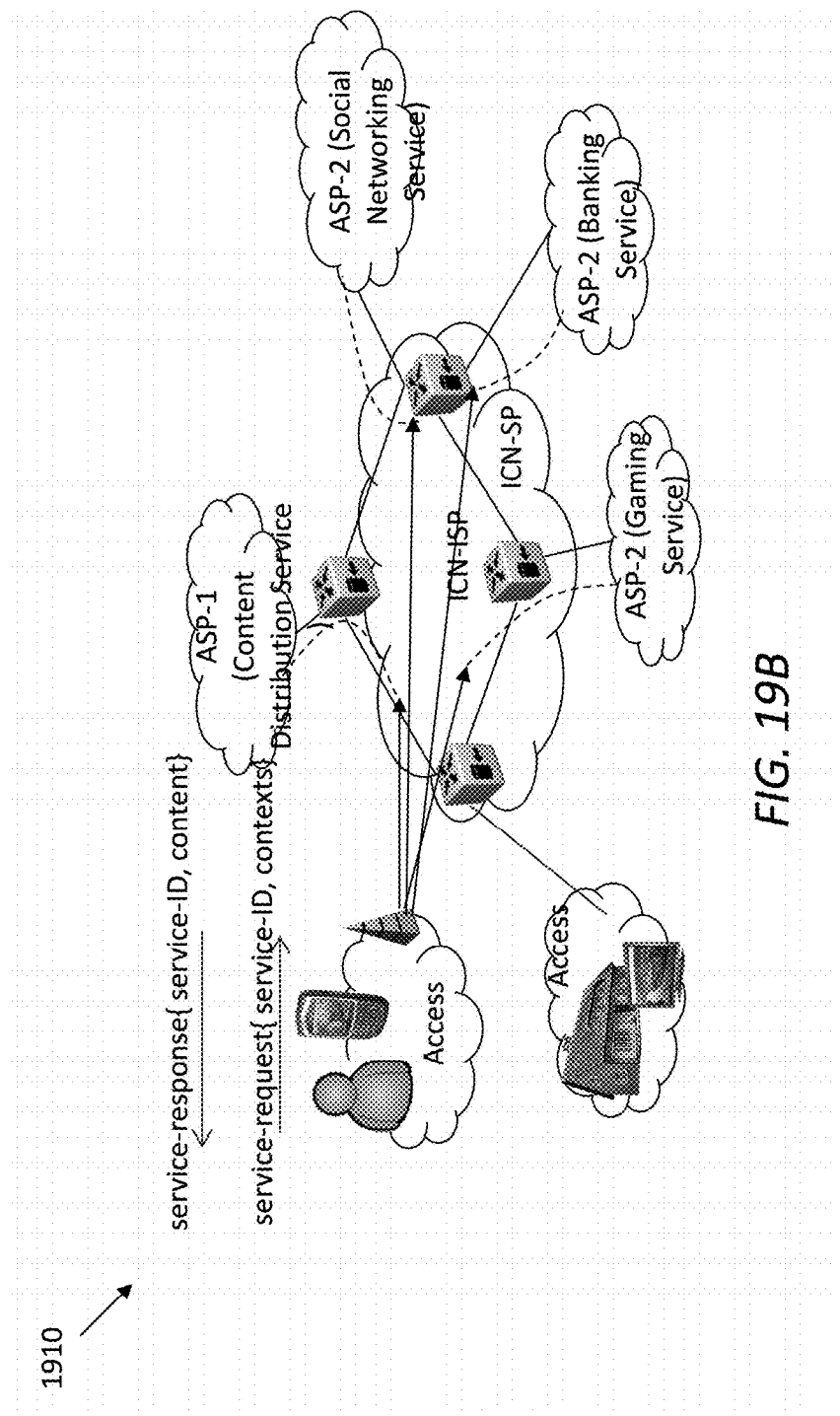
FIG. 19B illustrate an embodiment of another network framework.

FIG. 19B illustrate an embodiment of a network framework or architecture 1910, which may be utilized to realize contextualized edge-cloud service objectives. Diverse services, such as content distribution, social network, banking, and gaming, may be provided by one or more ASPs. The diverse services may be enabled over an ICN-SP network through contractual service layer agreements (SLAs) overlaid on virtualized computation, storage, and bandwidth resources. The user may send out a service request comprising a service ID along with contexts to any of the ASPs through the ICN-SP, and in return, receive a service response comprising the service ID and returned data.

Figure 19C:
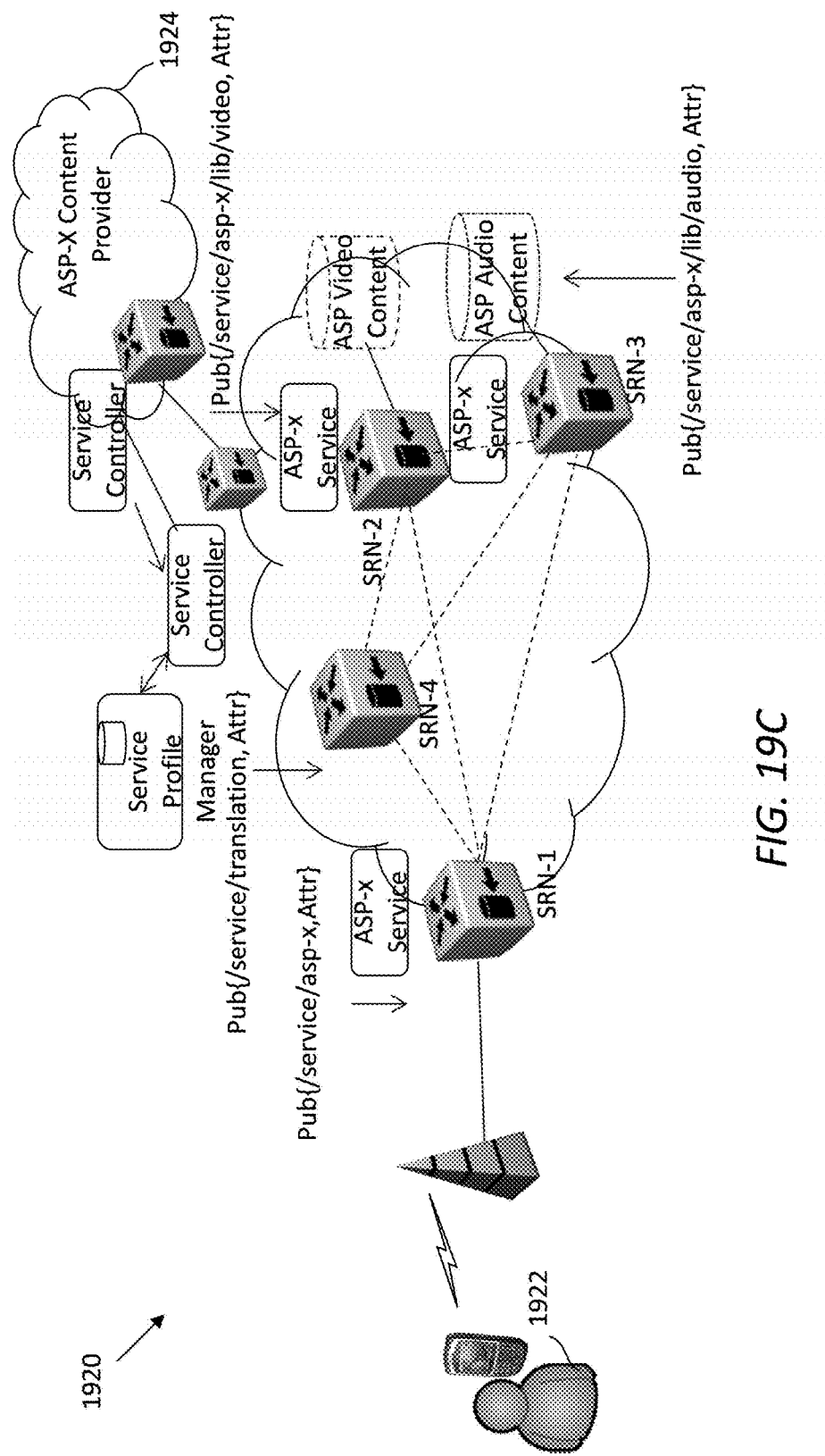
FIGS. 19C and 19D illustrate an implementation in which an application service provider (ASP) is providing video service with personalized translation to consumers.
Figure 19D:
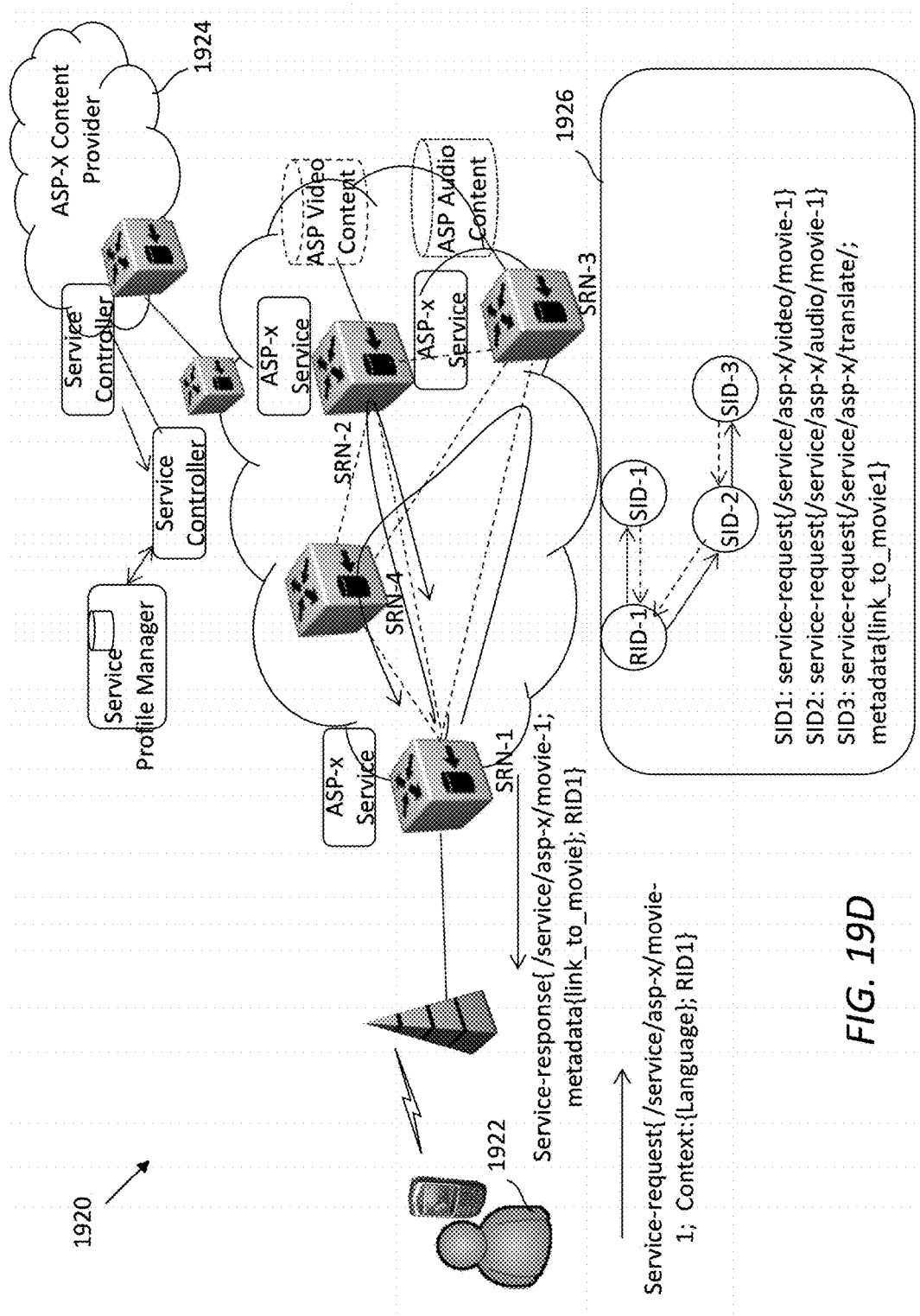

As a specific service example, FIGS. 19C and 19D illustrate an implementation 1920 in which an ASP (denoted as ASP-x) 1922 is providing video service with personalized translation to its consumers including a UE 1924. In this case, the UE 1924 may request video service with a language of choice, and an in-network service may decompose the request to three services: (1) extracting the video file from the video storage; (2) extracting the audio file; and (3) routing the extracted audio file through a translation service instance and then merging it with the video content to generate the service-response.

For illustrative purposes, we may assume the ASP-x 1922 has negotiated an edge-cloud service agreement with the ICN-SP. Service provisioning may be performed such that virtual computing and storage resources in routers denoted as SRN1, SRN2, and SRN3 may be dedicated to support the video service by ASP-x 1922. Service resolution may be enabled by publishing the service with desired attributes (e.g. lifetime) by the SAPs in routers SRN1, SRN2 and SRN3. Here, SRN1 may resolve to process the service request, while SRN2 and SRN3 may resolve to the video and/or audio content storage of ASP-x 1922.

The service and the storage instances may be distinguished through their namespace. For example, the SRN1 may process user requests under a service name: /service/ asp-x, the SRN2 may serve video content under a service name: /service/asp-x/lib/video, and the SRN3 may serve audio content under a service name: /service/asp-x/lib/audio. Further suppose that another ASP or the ISP itself may have an instance of audio translation service in the SRN4 that is published under the service name: /service/audio/translation.

Subsequently, as shown in FIG. 19D, when a user request for video service denoted as /service/asp-x/movie-1 arrives at the SRN1, a service orchestration process in the SRN1 may decompose the service, and a service logic graph 1926 as shown in FIG. 19D may be generated. The service logic graph 1926 may then be embedded as a service navigation vector to execute service functions. In the implementation 1910, the service request from the user 1924 to obtain video and translated audio content may be processed as parallel service functions, which may be finally composed at SRN1 to generate the service response for the user 1924.

Next to describe relates to how the disclosed ICN-based SCN framework manages service producer mobility, which includes both intra and inter G-SAP service producer mobility management. An ISP may provide multiple network access technologies for a UE. For instance, a mobile device UE may switch connectivity between different radio access networks within the same ISP domain. The mobility management in one ISP domain may also be referred to as inter radio access technology mobility management. This mechanism may also be similarly applied in a more general inter network-access technology mobility management.

Figure 20:
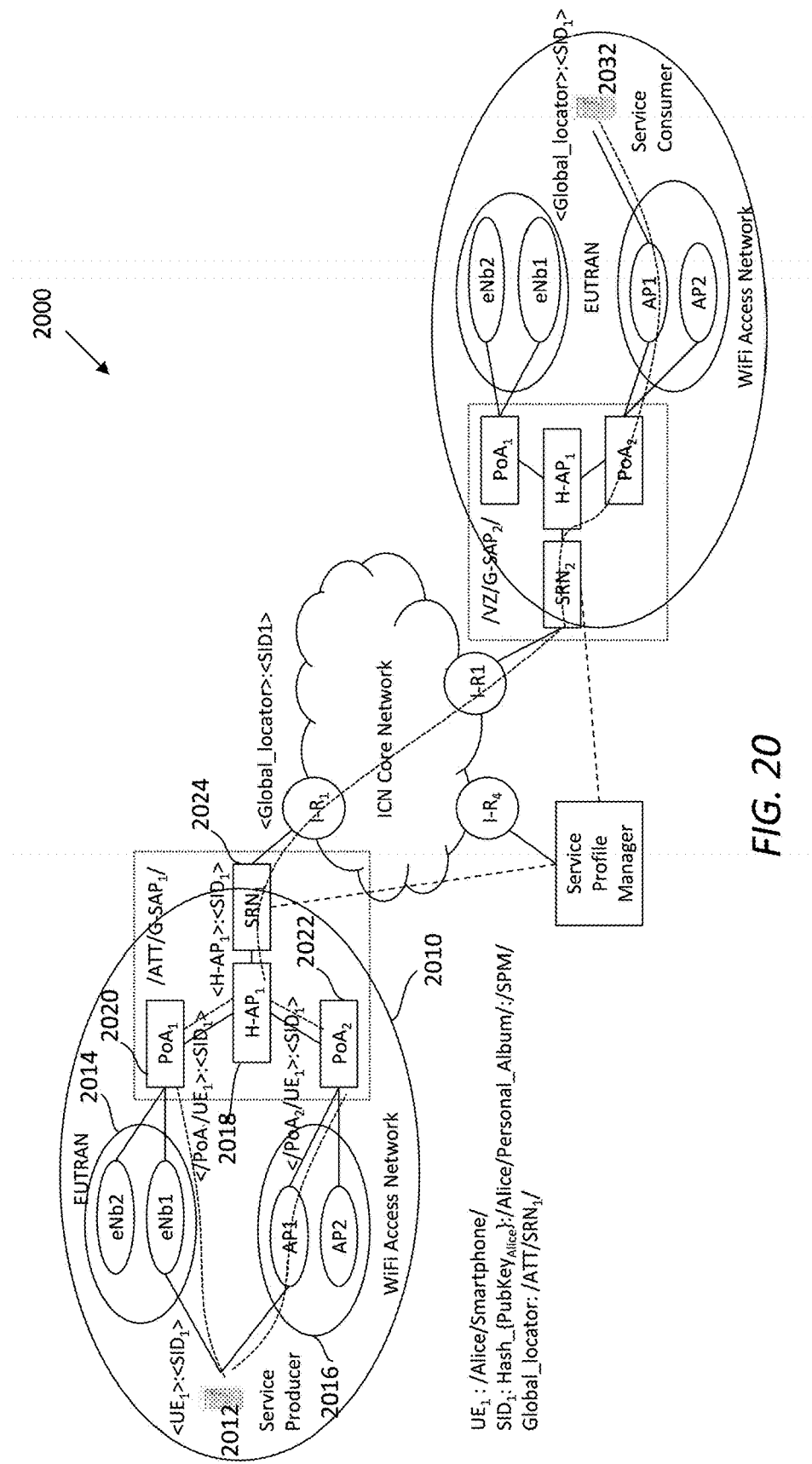
FIG. 20 illustrates an embodiment of a mobility management scheme.

FIG. 20 illustrates an embodiment of a mobility management scheme 2000. Assume that, in a service domain 2010, a service provider or producer 2012 (identifiable by $UE_1$) is using an AT&T LTE access or connectivity 2014 to provide a personal album access service (identifiable by $SID_1$) to the general public. Assume the service producer 2012 is moving from the AT&T LTE access 2014 to an AT&T WiFi access 2016 while providing the service. Note that both accesses 2014 and 2016 belong to AT&T. As shown in FIG. 20, an $H-AP_1$ 2018 is coupled to the LTE access 2014 via a $PoA_1$ 2020, and coupled to the WiFi access 2016 via a $PoA_2$ 2022. The LTE access 2014 may comprise a number of base stations denoted as eNb1 and eNb2, and the WiFi access 2016 may comprise a number of access points (AP) denoted as AP1 and AP2. Both the eNbs and APs may be access points from the perspective of the network layer, but within different radio access layers. The LTE access 2014 may use an Evolved UMTS (Universal Mobile Telecommunications System) Terrestrial Radio Access (EUTRA) interface. Further, assume that an MST at the $PoA_1$ 2020 and an MST at the $H-AP_1$ 2018 already have a record about the network attachment of the service provider 2012, and that the SAST at the $H-AP_1$ 2018 also stores an entry about the access context for $SID_1$, which is $/PoA_1/UE_1/$ with a highest priority.

In an embodiment, when the service provider 2012 decides to use the WiFi access 2016 to provide $SID_1$, there may be a few steps to be finished. A first step is to register the new network connection. More specifically, $UE_1$ may register at the $PoA_2$ 2022, which notifies the $H-AP_1$ 2018 about the new registration of $UE_1$. Then, the $PoA_2$ 2022 and the $H-AP_1$ 2018 may update their MSTs with the new access context information, respectively. The priority value for $UE_1$'s new connection may be set as the highest priority by default in the MSTs at both the $PoA_2$ 2022 and the $H-AP_1$ 2018. Moreover, the MST at the service engine may be synchronized.

In a second step, an MC and a SAC at the $H-AP_1$ 2018 may coordinate with each other about the new network access (i.e., access 2016) from $UE_1$, and update the SAST with a new access context state and other relevant entries for $SID_1$. The SAST at the service engine may be synchronized.

When the new connection is setup, $UE_1$ may make a de-registration request to $PoA_1$ 2020, which may notify the $H-AP_1$ 2018 about this de-registration. Then $H-AP_1$ 2018 and $PoA_1$ 2020 may update their MSTs respectively. At $H-AP_1$ 2018, the MC may coordinate with the SAC to update the service access status for $SID_1$ through $/PoA_1/UE_1/$ (e.g., service from up to down). Because the $UE_1$ may not send a message saying it will no longer use the LTE access 2014 to offer service access, the other fields in the SAST may be kept for the $/PoA_1/UE_1/$. Therefore, both MST and SAST at the service engine may be updated.

The changing of access network may remain transparent to service consumers including a service consumer 2032, as an intra domain handover may not affect a global locator of the service $SID_1$. Since both the accesses 2014 and 2016 belong to AT&T, it may still be $/ATT/SRN_1/$ that is the result of service resolution. When an interest arrives at an $SRN_1$ 2024, the $SRN_1$ 2024 may check its service profile DB. If the $SRN_1$ 2024 determines that $SID_1$ is available from $H-AP_1$ 2018, it may update the routing prefix as $H-AP_1$ 2018 and forwards the interest to $H-AP_1$ 2018.

Depending on the situation, the forwarding of an incoming interest at the $H-AP_1$ 2018 may be conducted differently. In a first exemplary case, before $H-AP_1$ 2018 updates its MST with the new network access context states from $UE_1$, a SAST in the $H-AP_1$ 2018 has not been updated with the new access context either. In the first case, the $H-AP_1$ 2018 may still forward the interest to the $PoA_1$ 2020 ($/PoA_1/UE_1/$).

In a second exemplary case, if the $H-AP_1$ 2018 is processing the de-registration request from $UE_1$ and updating an MST in the $H-AP_1$ 2018, the incoming interest may be cached until both MST and SAST in the $H-AP_1$ 2018 have been updated. After that, a Service Engine in the $H-AP_1$ 2018 may check the SAST and determine that the service $SID_1$ is accessible from both $/PoA_1/UE_1/$ and $/PoA_2/UE_1/$, and both have the same priority. Further, the Service Engine may check its MST and determine that both $/PoA_1/UE_1/$ and $/PoA_2/UE_2/$ have the same priority for the access. In the second case, the $H-AP_1$ 2018 may bi-cast the interest to both PoAs 2020 and 2022, which then forward the interest to the $UE_1$. More, the $H-AP_1$ 2018 may bi-receive service received data from both PoAs 2020 and 2022, select the first arrived data, and send it back to the consumer 2032 via the $SRN_1$ 2024 and other network devices.

In a third exemplary case, the interest may arrive at the $PoA_1$ 2018 which is currently processing de-registration from $UE_1$. In the third case, the interest may be dropped. In a fourth exemplary case, the interest may arrive at the $UE_1$, which is about to de-register with the $PoA_1$ 2018. In the fourth case, the $UE_1$ may send the data back to the $H-AP_1$ 2018, not via the $PoA_1$ 2020 but via the $PoA_2$ 2022.

Ideally, we expect a make-before-break handoff to provide seamless services such as VoIP or real-time applications on a mobile device, while the mobile device is moving between two ISP networks (e.g., AT&T and SPRINT). However, some of today's mobile devices have only one interface for one radio access technology, e.g., with one global system for mobile (GSM) subscriber identification module (SIM) card per device. Thus, a break-before-make handoff can be used to realize inter G-SAP service producer mobility management.

Figure 21:
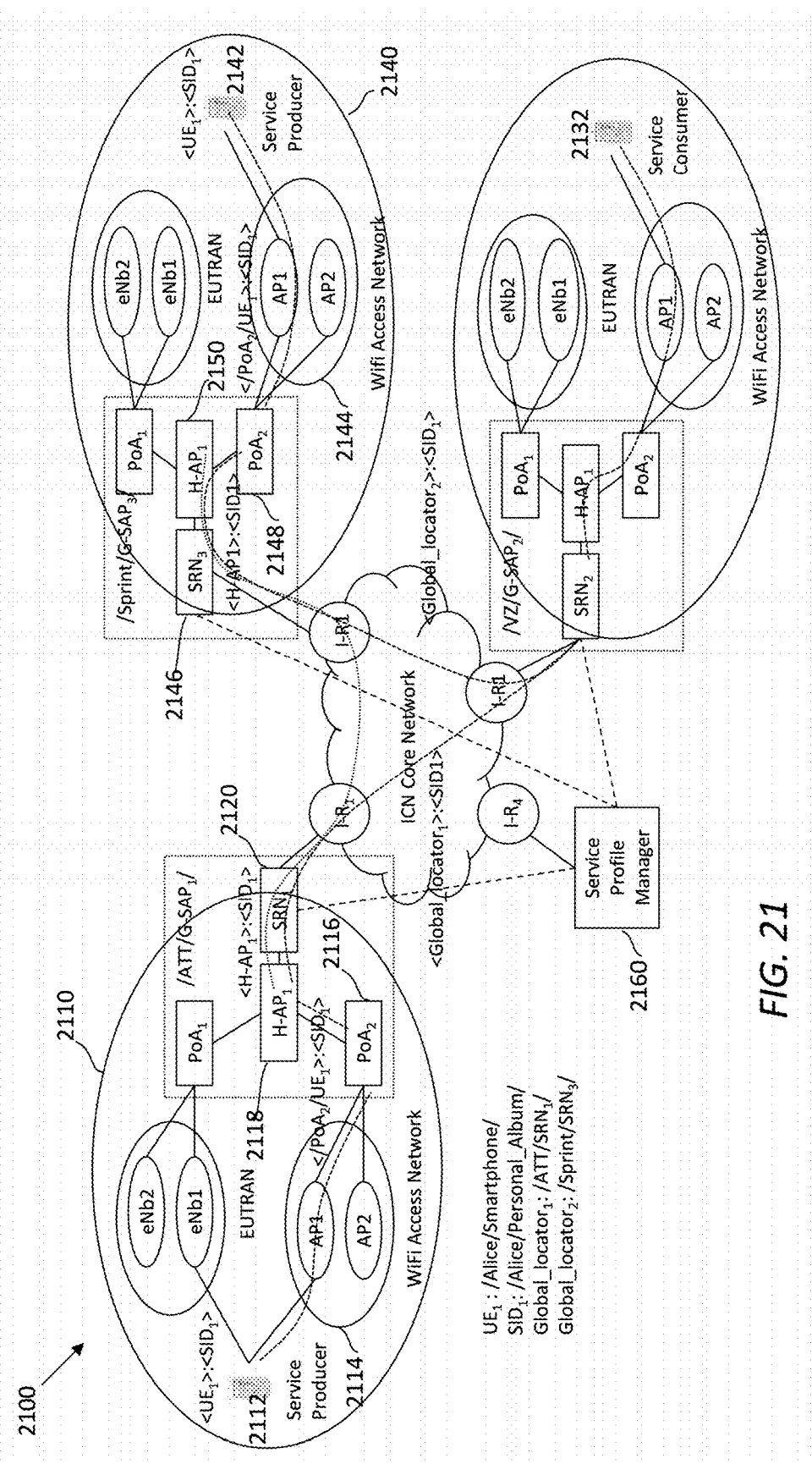
FIG. 21 illustrates an embodiment of an inter generic service access point (G-SAP) service producer mobility management scheme.

FIG. 21 illustrates an embodiment of an inter G-SAP service producer mobility management scheme 2100. The scheme 2100 assumes that an ISP for Alice's home network is SPRINT, thus a service domain 2140 comprising Alice's $UE_1$ 2142 belongs to SPRINT. Further, the scheme 2100 assumes that Alice would like to connect the $UE_1$ 2112 to a foreign network AT&T, which is represented by an AT&T service domain 2110.

As shown in FIG. 21, Alice was originally using a WiFi access 2144 in the SPRINT domain 2140 to provide her personal album access service (identifiable via and denoted as $SID_1$) and now wants to move to a different location which uses a WiFi access 2114 in the AT&T domain 2110. In this case, a global location for the personal album access service may no longer be "/SPRINT/$SRN_3$/." An embodiment of a break-before-make handoff may comprise several steps.

Before the handoff happens, the $UE_1$ 2142 resides in the home network—SPRINT domain 2140. Thus, a service provide DB located in an $SRN_3$ 2146 which resides in the domain 2140, may keep a record about the location of $SID_1$. The location may be an H-$AP_1$ 2150. An SAST in the H-$AP_1$ 2150 may store the $SID_1$, which is available from /$PoA_2$/$UE_1$/.

Next is a de-registration process which may include two sub-cases. A first exemplary sub-case assumes that the $UE_1$ 2142 is permanently disconnected from the WiFi access 2144, and $SID_1$ is permanently removed from the domain 2140. A second exemplary sub-case assumes that the $UE_1$ 2142 is temporarily disconnected from the WiFi access 2144, and $SID_1$ is expected to be offered in the domain 2140 in the future.

In the first exemplary sub-case, the $UE_1$ 2142 may send a permanent de-registration request to the $PoA_2$ 2148 in the service domain 2140 (home network). The $PoA_2$ 2148 may notify an H-$AP_1$ 2150 which connects the $PoA_2$ 2148 and the $SRN_3$ 2146. Both $PoA_2$ 2148 and H-$AP_1$ 2150 may remove relevant entries from their MSTs, respectively. At the H-$AP_1$ 2150, an MC may communicate with a SAC about this permanent disconnection by $UE_1$ 2142, so the SAC may remove the entries corresponding with /$PoA_2$/$UE_1$/. If /$PoA_2$/$UE_1$/ is the only access context for $SID_1$ in the SAST of the H-$AP_1$ 2150, the SAC may send a message to a service publish manager at the $SRN_3$ 2146. The publish manager may then remove the record about $SID_1$ from a Service Profile DB in the $SRN_3$ 2146. Afterwards, the publish manager may further update a record in a SPM 2160. Note that, during this process, the MST and SAST in a service engine may be updated accordingly.

In the second exemplary sub-case, the $UE_1$ 2142 may send a temporary de-registration request to the $PoA_2$ 2148 in the domain 2140. The $PoA_2$ 2148 may send a notice to the H-$AP_1$ 2150 about the disconnection of the $UE_1$ 2142. Then, the H-$AP_1$ 2150 and the $PoA_2$ 2148 may update their MSTs, respectively, and the H-$AP_1$ 2150 may update its SAST. Since the disconnection of the $UE_1$ 2142 is temporary, the SAST of the H-$AP_1$ 2150 may update the service access status but may not remove the whole entry. During this procedure, the $UE_1$ 2142 may stop responding to interests, thus all incoming interests may be cached at the H-$AP_1$ 2150. Further, since $SID_1$ is not permanently removed from the H-$AP_1$ 2150 and the $SRN_3$ 2146, global service resolution may still result in /SPRINT/$SRN_3$/as $SID_1$'s global locator.

As shown in FIG. 21, the $UE_1$ 2142 roams to a different ISP network—AT&T network, thus it is represented using a different $UE_1$ 2112 (UE still the same but location changed).

The $UE_1$ 2112 may not officially decide to publish service through the AT&T network, so the D portion in the <P:I:D> form of the $SID_1$ may not change. The $UE_1$ 2112 may send network registration via the WiFi access 2114 to $PoA_2$ 2116 in the AT&T domain 2110. The $PoA_2$ 2116 may notify an H-$AP_1$ 2118 in the domain 2110 accordingly.

Once both the H-$AP_1$ 2118 and the $PoA_2$ 2116 in the AT&T service domain 2110 update their MSTs, MCs residing in both the H-$AP_1$ 2118 (/AT&T/$SRN_1$/H-$AP_1$/) and the H-$AP_1$ 2150 (/SPRINT/$SRN_3$/H-$AP_1$/) may coordinate with each other about the mobility of $UE_1$. More specifically, an MC in the H-$AP_1$ 2118 may notify its coupled SAC that the H-$AP_1$ 2118 is the new resolution point for $SID_1$. Then, the SAC in the H-$AP_1$ 2118 may send one or more control messages to the $SRN_3$ 2146 via an $SRN_1$ 2120. The $SRN_3$ 2146 may communicate with the $SRN_1$ 2120 (/AT&T/$SRN_1$/) to update a service profile DB in the $SRN_1$ 2120 about $SID_1$'s current access context in the AT&T domain 2110.

On the other hand, the $SRN_3$ 2146 may send a control message to a SRS, which is represented as D in the $SID_1$'s<P:I:D> form. The SRS may add a new resolution point for $SID_1$ in a name resolution record, and mark the old resolution point of the $SRN_3$ 2146 as temporarily unavailable. Therefore, when a new service resolution request is sent to the SRS, the SRS may return with the $SRN_1$ 2120 as the global locator for $SID_1$.

If the $UE_1$ 2112 moves back to its original home network the SPRINT domain 2140, the SPM 2160 may remove the temporary resolution point of $SRN_1$ 2120 and update the $SRN_3$ 2146 as available again. In this way, triangular routing can be avoided.

If the $UE_1$ 2112 decides to use AT&T as the home network for $SID_1$ in a future time, the $UE_1$ 2112 may send a new service publish message to the H-$AP_1$ 2118, which may then update its SAST with a permanent record. The $SRN_1$ 2120 may update its service profile DB as well. The permanent update may affect service resolution results in the future. Note that re-homing may also result in new <P:I:D> which should be republished. A new global locator for $SID_1$ may be the $SRN_1$ 2120. Therefore, when a service consumer 2132 resolves the service name again, the service consumer 2132 may get the new global locator of the $SRN_1$ 2120 for the $SID_1$. Accordingly, the interest may be forwarded to the AT&T service domain 2110 directly.

The scheme 2100 may not affect the service consumer 2132 in terms of service navigation, although the service domain has been changed from 2140 to 2110. In use, if the $UE_1$ moves to a different service domain, and the $UE_1$ does not republish $SID_1$ globally, an interest from the service consumer 2132 may still be forwarded to the $UE_1$ via the home network (i.e., the SPRINT service domain 2140). The $SRN_3$ 2146 may indicate that the service is available from H-$AP_1$ 2150. The interest from the service consumer 2132 may arrive at the H-$AP_1$ 2150, which may check its SAST and determines that $SID_1$ is currently provided by the $SRN_1$ 2120 in the AT&T service domain 2110. In this case, the H-$AP_1$ 2150 may use a prefix of /ATT/$SRN_1$ as the routing prefix. The interest may be re-forwarded to the AT&T service domain 2110 and reach the $UE_1$ 2112 by indirection at the H-$AP_1$ 2118. As shown by the scheme 2100, mobility may be realized on the SAP level or between domains.

Figure 22:
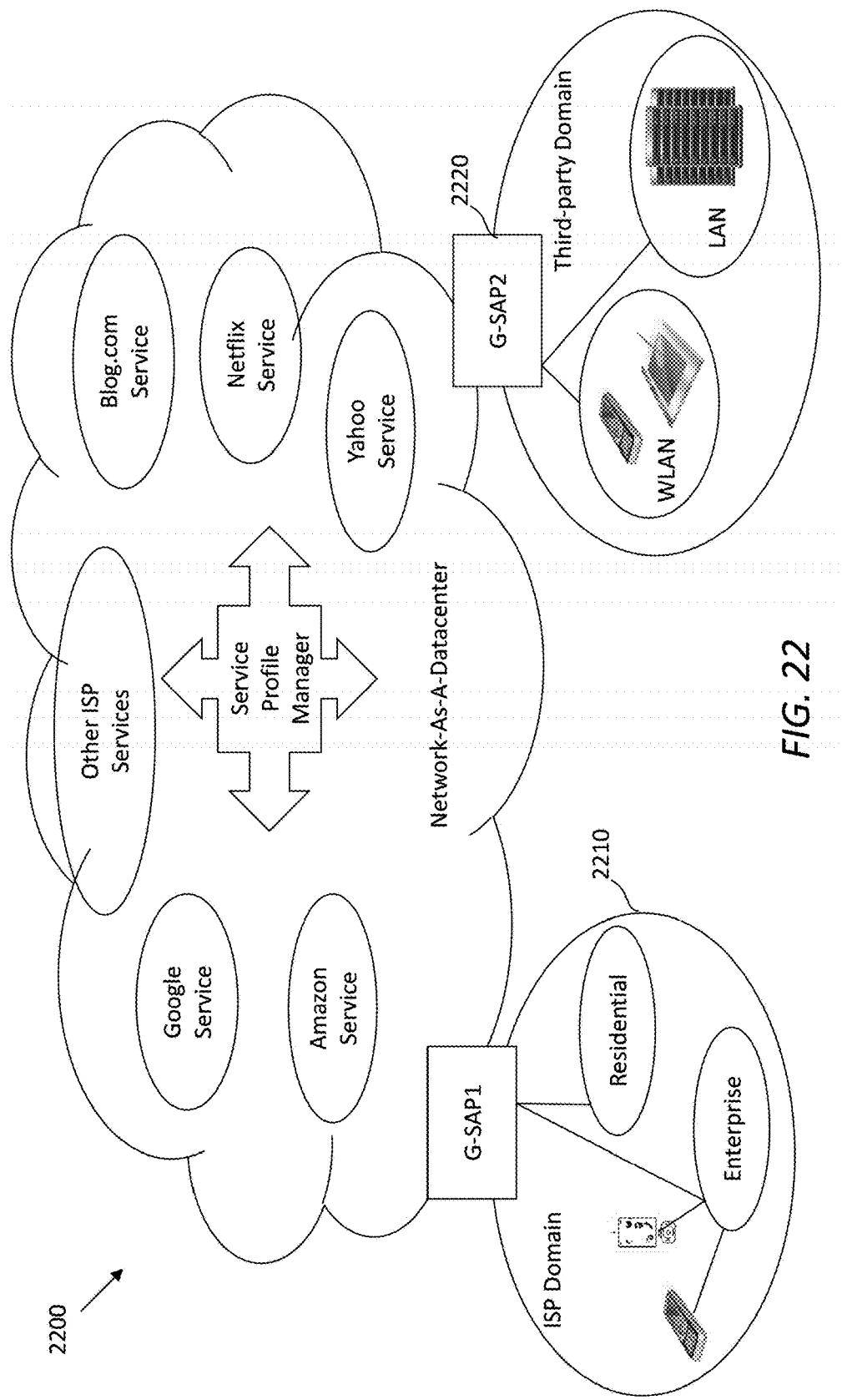
FIG. 22 illustrates an embodiment of a Network-As-A-Datacenter model.

As mentioned previously, embodiments of the disclosed ICN-based SCN framework may enable a whole network to behave like a datacenter, which is referred to as Network-As-A-Datacenter. FIG. 22 illustrates an embodiment of a Network-As-A-Datacenter model 2200. Service applications may be provided collocated with content routers, which may be in collocated data centers or third party domains, so the whole core network may be considered as a data center. For example, a variety of services provided by different entities, such as GOOGLE, AMAZON, YAHOO, NETFLIX, BLOG.COM, and other ISPs may be made accessible to UEs located in different domains, such as an ISP domain 2210 and a third-party domain 2220. The services may be accessed via G-SAPs 2212 and 2222, the details of which have been described in detail.

Each of the G-SAPs 2212 and 2222 may comprise an SRN. An SRN residing in the home network of service consumer(s) may work as a service access proxy to various types of services, including extra context-aware services and service primitives that collaborate with each other to fulfill one service interest. The SRN may be the entry point to the datacenter model 2200. Once the SRN receives an interest from a consumer, the SRN may interpret the service request and contexture information of the consumer. Further, the SRN may decompose the request into multiple services and creates a service logic graph to help navigate service interests.

For each domain that publishes services, there may be an SRN at the edge of the domain serving as a service gateway. When an interest to a particular service in the domain arrives at the SRN, the SRN may decompose a service interest into multiple tasks, which may be performed at one or more servers. The servers may host instances of the same application but may have different network resource allocations. A corresponding service publisher may decide to deploy a service instance at a different domain, e.g., according to statistics of consumer requests and other contextual information. Thus, an actual routing path of services at the ICN transport layer may be changed dynamically, although the service logic graph keeps the same.

Figure 23:
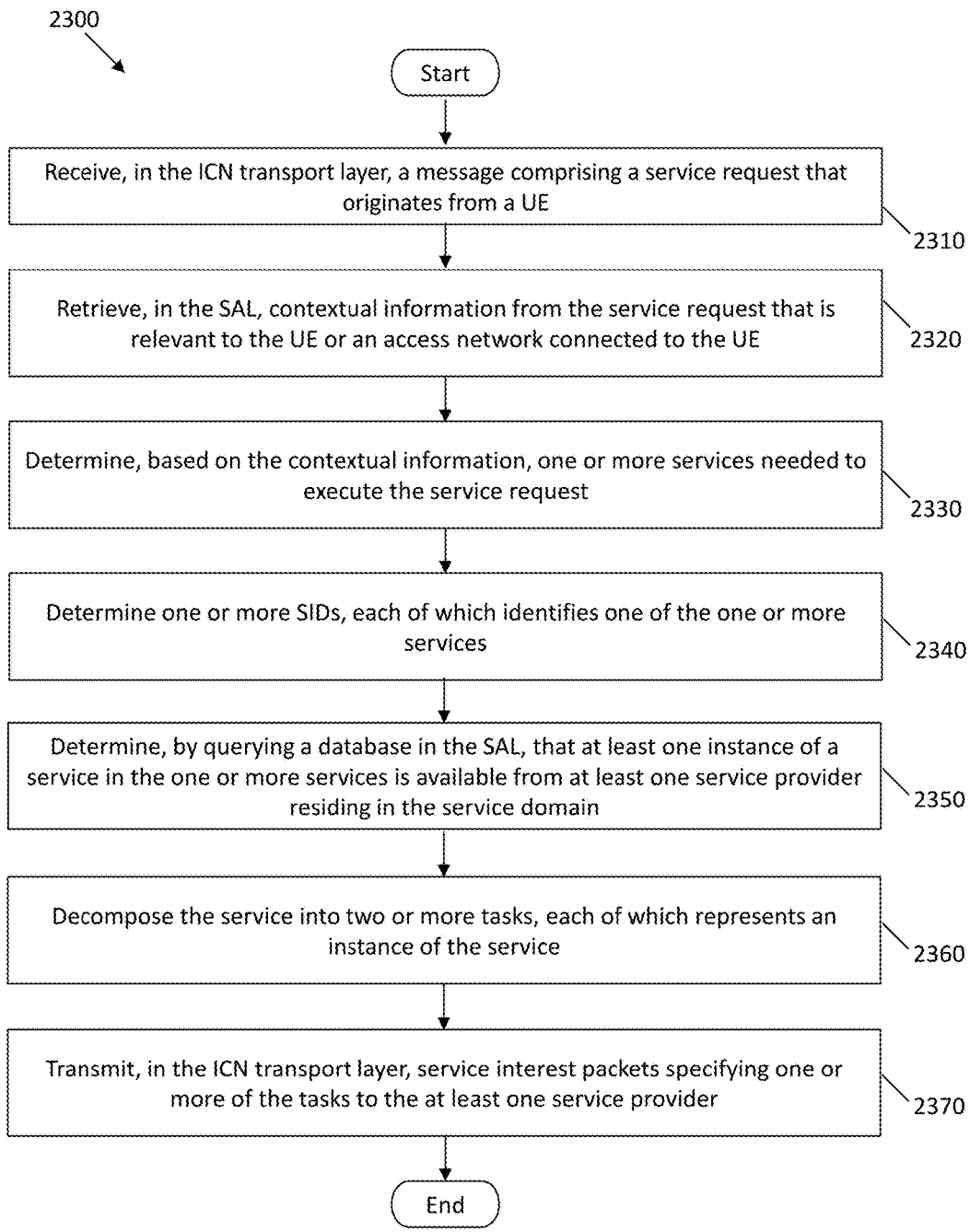
FIG. 23 illustrates an embodiment of a service processing method implemented by an SRN.

FIG. 23 illustrates an embodiment of a service processing method 2300, which may be implemented by a network device residing in a service domain and functioning as an SRN (e.g., the SRN 132 or 200). The SRN may comprise an ICN transport layer (e.g., the ICN layer 214) and a SAL (e.g., the SAL 220) for handling context-aware service logistics and service mobility overlaid on the ICN transport layer. The service logistics may include, for example, service management functionalities such as discovery and service request. The method 2300 starts in step 2310, in which the SRN may receive, in the ICN transport layer, a message comprising a service request that originates from a UE. In step 2320, the SRN may retrieve, in the SAL, contextual information from the service request that is relevant to the UE or an access network connected to the UE. In an embodiment, the access network may be a wired, wireless, or mobile connection connected to the UE, and the contextual information may include at least one of device context of the UE, mobility context of the UE, environment context of the UE, context of the access network, and personal or social context of a service consumer using the UE.

Figure 24:
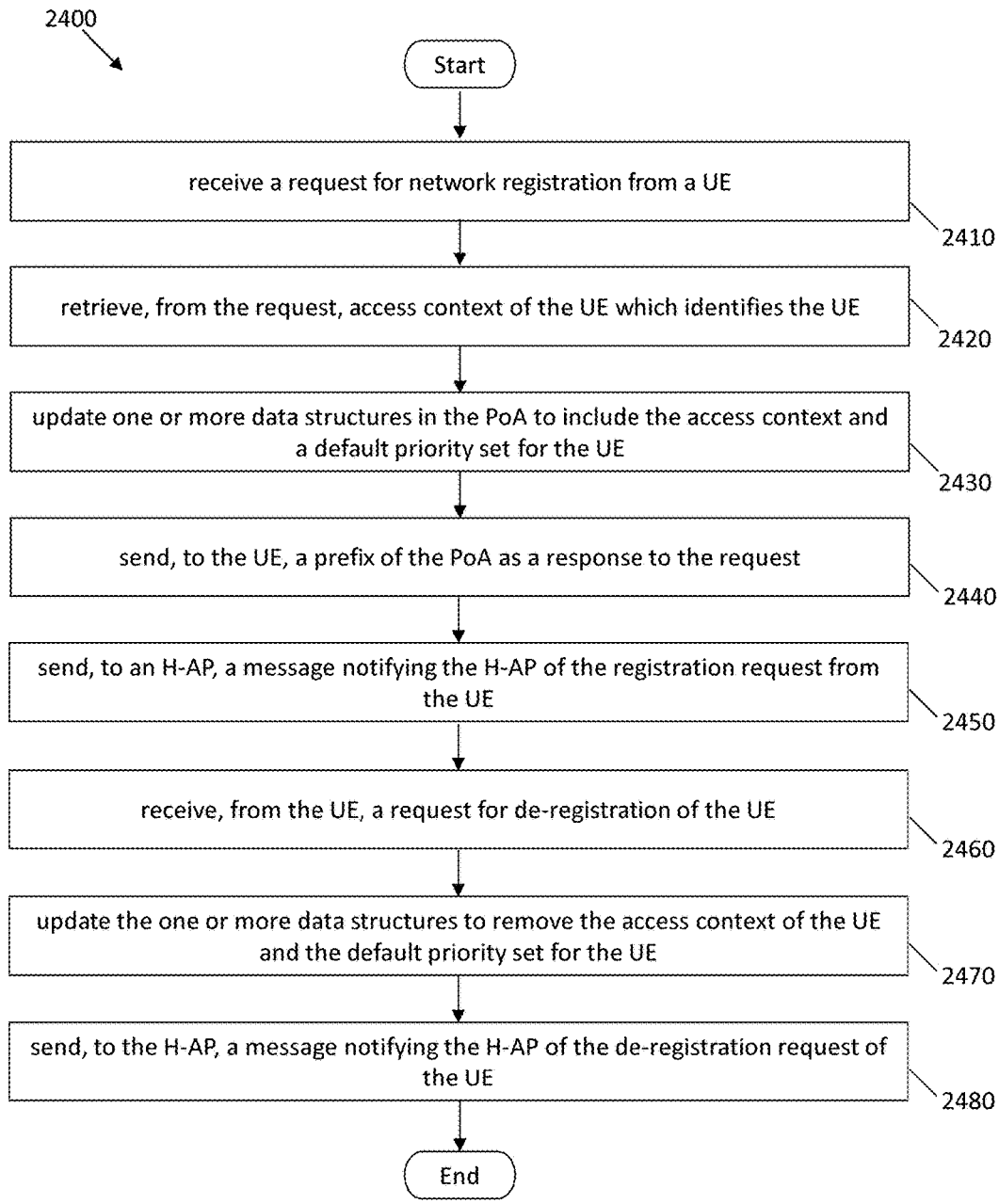
FIG. 24 illustrates an embodiment of a service processing method implemented by a PoA.

In step 2330, the SRN may determine, based on the contextual information, one or more services needed to execute the service request. In step 2340, the SRN may determine one or more SIDs, each of which identifies one of the one or more services. Although not shown in FIG. 23, in an embodiment, determining the one or more SIDs may comprise translating the contextual information into a service description written in a standard service description language, and resolving the service description to the one or more corresponding SIDs by using a policy database (e.g., the policy DB 236) in the SAL. In step 2350, the SRN may determine, by querying a database (e.g., the service profile DB 240) in the SAL, that at least one instance of a service in the one or more services is available from at least one service provider residing in the service domain. In step 2360, the SRN may decompose the service into two or more tasks, each of which represents an instance of the service. In step 2370, the SRN may transmit, in the ICN transport layer, service interest packets specifying one or more of the tasks to the at least one service provider FIG. 24 illustrates an embodiment of a service processing method 2400, which may be implemented by a network device functioning as a PoA (e.g., the PoA 600). The method 2400 starts in step 2410, in which the PoA may receive a request for network registration from a UE. In step 2420, the PoA may retrieve, from the request, access context of the UE which identifies the UE. In step 2430, the PoA may update one or more data structures (e.g., the MST 618) in the PoA to include the access context and a default priority set for the UE. In step 2440, the PoA may send, to the UE, a prefix of the PoA as a response to the request. In step 2450, the PoA may send, to an H-AP, a message notifying the H-AP of the registration request from the UE, wherein the PoA has registered with the H-AP.

Further, in step 2460, the PoA may receive, from the UE, a request for de-registration of the UE. In step 2470, the PoA may update the one or more data structures to remove the access context of the UE and the default priority set for the UE. In step 2480, the PoA may send, to the H-AP, a message notifying the H-AP of the de-registration request of the UE. A person of ordinary skill in the art will recognize that variations of the methods, such as adding additional steps, skipping or merging some steps, and changing execution orders, may exist and are within the scope of this disclosure.

Figure 25:
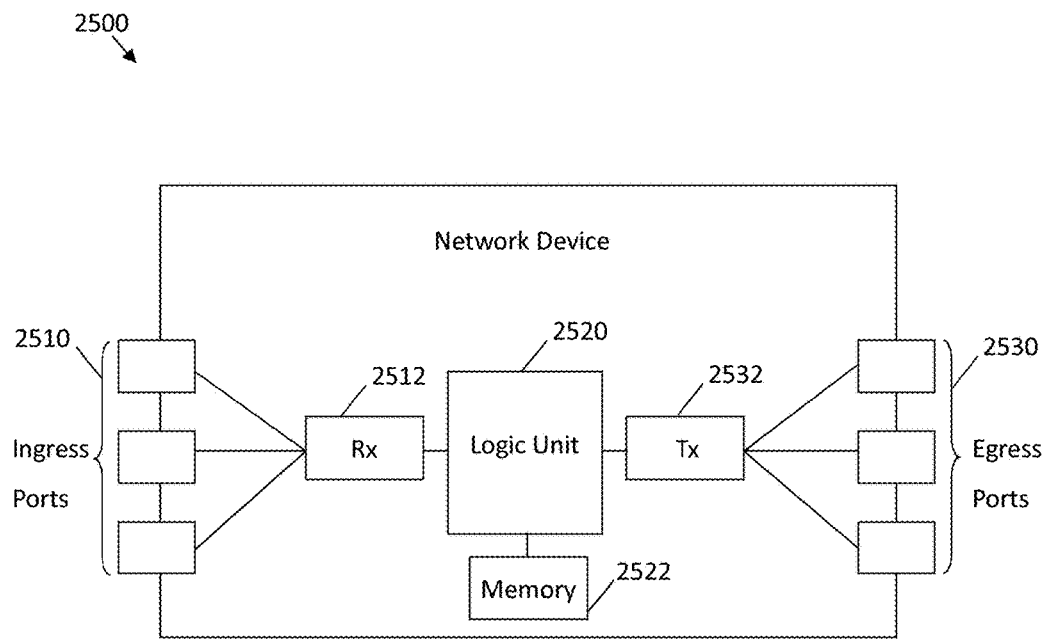
FIG. 25 illustrates an embodiment of a network device.

FIG. 25 illustrates an embodiment of a network device or unit 2500, which may be configured to facilitate transportation of ICN service flows or optical flows through a network. The network device 2500 may comprise one or more ingress ports 2510 coupled to a receiver 2512 (Rx), which may be configured for receiving service or optical flows comprising packets or frames, objects, options, and/or type length values (TLVs) from other network components. The network device 2500 may comprise a logic unit or processor 2520 coupled to the receiver 2512 and configured to process the packets or otherwise determine to which network components to send the packets. The logic unit or processor 2520 may be implemented using hardware or a combination of hardware and software. The network device 2500 may further comprise a memory 2522, in which one or more databases or data structures may be implemented. The network device 2500 may also comprise one or more egress ports 2530 coupled to a transmitter 2532 (Tx), which may be configured for transmitting packets or frames, objects, options, and/or TLVs to other network components. The logic unit or processor 2520, the receiver 2512, and the transmitter 2532 may also be configured to implement or support at least part of any of the schemes and methods described above, such as the service request processing method 300, the work flow 400, the service request decomposition scheme 1200, the service orchestration scheme 1300, the request routing scheme 1550, the UE registration process 1700, the work flow 1770, the service publishing process 1800, the work flow 1870, the work flow 1900, the mobility management schemes 2000 and 2100, and the service processing methods 2300 and 2400.

Figure 26:
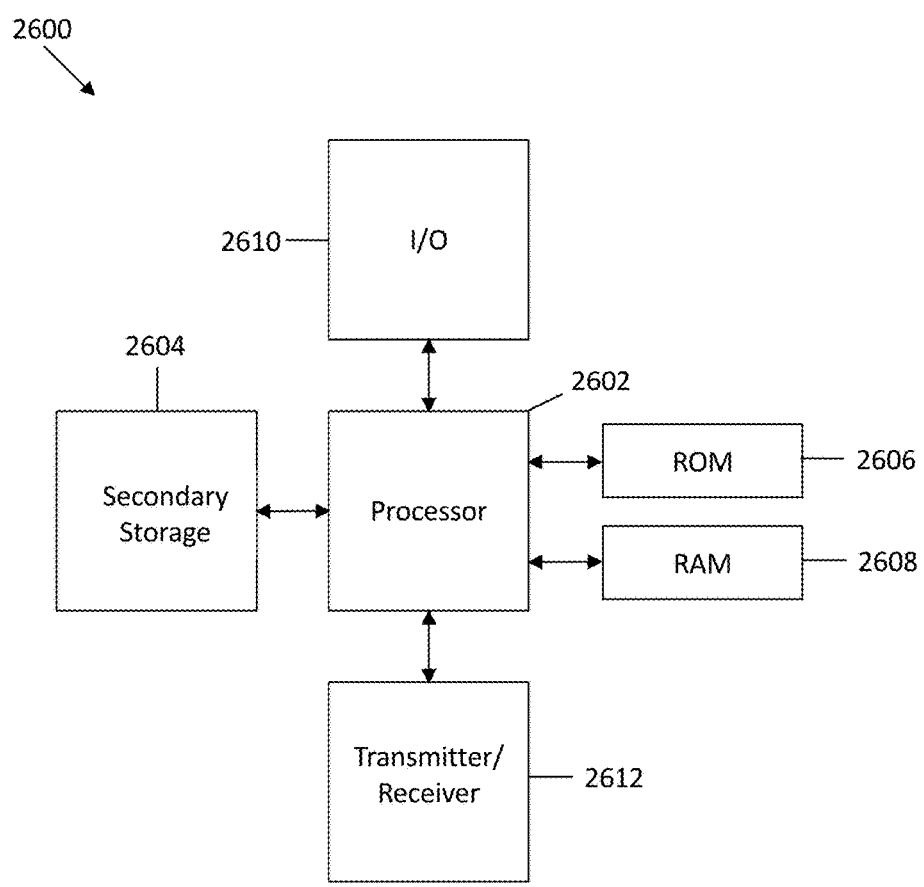
FIG. 26 illustrates an embodiment of a computer system.

The schemes described above may be implemented on a network component, such as a computer or network component with sufficient processing power, memory resources, and network throughput capability to handle the necessary workload placed upon it. FIG. 26 illustrates an embodiment of a computer system or network node 2600 suitable for implementing one or more embodiments of the systems disclosed herein, such as the SRN 200, the H-AP 500, the PoA 600, the UE 700, and the SPM 800 described above.

The computer system 2600 includes a processor 2602 that is in communication with memory devices including secondary storage 2604, read only memory (ROM) 2606, random access memory (RAM) 2608, input/output (I/O) devices 2610, and transmitter/receiver (transceiver) 2612. Although illustrated as a single processor, the processor 2602 is not so limited and may comprise multiple processors. The processor 2602 may be implemented as one or more central processor unit (CPU) chips, cores (e.g., a multi-core processor), field-programmable gate arrays (FPGAs), application specific integrated circuits (ASICs), and/or digital signal processors (DSPs). The processor 2602 may be configured to implement at least part of any of the schemes described herein, including the service request processing method 300, the work flow 400, the service request decomposition scheme 1200, the service orchestration scheme 1300, the request routing scheme 1550, the UE registration process 1700, the work flow 1770, the service publishing process 1800, the work flow 1870, the work flow 1900, the mobility management schemes 2000 and 2100, and the service processing methods 2300 and 2400. The processor 2602 may be implemented using hardware or a combination of hardware and software.

The secondary storage 2604 is typically comprised of one or more disk drives or tape drives and is used for non-volatile storage of data and as an over-flow data storage device if the RAM 2608 is not large enough to hold all working data. The secondary storage 2604 may be used to store programs that are loaded into the RAM 2608 when such programs are selected for execution. The ROM 2606 is used to store instructions and perhaps data that are read during program execution. The ROM 2606 is a non-volatile memory device that typically has a small memory capacity relative to the larger memory capacity of the secondary storage 2604. The RAM 2608 is used to store volatile data and perhaps to store instructions. Access to both the ROM 2606 and the RAM 2608 is typically faster than to the secondary storage 2604.

The transmitter/receiver 2612 (sometimes referred to as a transceiver) may serve as an output and/or input device of the computer system 2600. For example, if the transmitter/receiver 2612 is acting as a transmitter, it may transmit data out of the computer system 2600. If the transmitter/receiver 2612 is acting as a receiver, it may receive data into the computer system 2600. Further, the transmitter/receiver 2612 may include one or more optical transmitters, one or more optical receivers, one or more electrical transmitters, and/or one or more electrical receivers. The transmitter/receiver 2612 may take the form of modems, modem banks, Ethernet cards, universal serial bus (USB) interface cards, serial interfaces, token ring cards, fiber distributed data interface (FDDI) cards, and/or other well-known network devices. The transmitter/receiver 2612 may enable the processor 2602 to communicate with an Internet or one or more intranets. The I/O devices 2610 may be optional or may be detachable from the rest of the computer system 2600. The I/O devices 2610 may include a display. The I/O devices 2610 may also include one or more keyboards, mice, or track balls, or other well-known input devices.

It is understood that by programming and/or loading executable instructions onto the computer system 2600, at least one of the processor 2602, the secondary storage 2604, the RAM 2608, and the ROM 2606 are changed, transforming the computer system 2600 in part into a particular machine or apparatus (e.g. the SRN 200, the H-AP 500, the PoA 600, the UE 700, or the SPM 800 having the functionality taught by the present disclosure). The executable instructions may be stored on the secondary storage 2604, the ROM 2606, and/or the RAM 2608 and loaded into the processor 2602 for execution. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner, as a machine controlled by a new ASIC is a particular machine or apparatus, likewise a computer that has been programmed and/or loaded with executable instructions may be viewed as a particular machine or apparatus.

Any processing of the present disclosure may be implemented by causing a processor (e.g., a general purpose CPU) to execute a computer program. In this case, a computer program product can be provided to a computer or a network device using any type of non-transitory computer readable media. The computer program product may be stored in a non-transitory computer readable medium in the computer or the network device. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), compact disc ROM (CD-ROM), compact disc recordable (CD-R), compact disc rewritable (CD-R/W), digital versatile disc (DVD), Blu-ray (registered trademark) disc (BD), and semiconductor memories (such as mask ROM, programmable ROM (PROM), erasable PROM), flash ROM, and RAM). The computer program product may also be provided to a computer or a network device using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations may be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term "about" means+/−10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having may be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. A network device functioning as a heterogeneous access point (H-AP) of an information-centric networking (ICN) network, the network device comprising:
   a receiver configured to receive a publishing message that advertises a new service; a service access controller (SAC) coupled to the receiver and configured to:
   add a new entry to a service access strategy table (SAST) in the SAC to reflect availability of the new service; and
   update the publishing message to generate an updated publishing message comprising a routing prefix with a name of the H-AP, wherein the routing prefix is for routing interests of the new service to the H-AP; and
   a transceiver coupled to the SAC and configured to:
   forward the updated publishing message; and
   transmit, to a second network device functioning as a service routing node (SRN), a notification message indicating that the new service is available from the H-AP,
   wherein the transceiver is further configured to receive, from a point of attachment (PoA), a notification message indicating network registration of a user equipment (UE), and wherein the SAC is further configured to:
   update an access profile database in the SAC with information of the UE; and
   update a mobility strategy table (MST) in the SAC to include access context states of the UE and the PoA,
   wherein the transceiver is further configured to send the routing prefix to the PoA in response to the notification message,
   wherein the transceiver is further configured to:
   receive, from the PoA, a request for de-registration of the UE;
   receive, from a second PoA, a second notification message indicating a new network registration of the UE, and
   send the routing prefix to the second PoA in response to the second notification message,
   wherein the SAC is further configured to update the MST to indicate the attachment of the UE to the second PoA, and
   wherein the SAC is further configured to determine that the service is still accessible from both the PoA and the second PoA and has a same priority, and wherein the transceiver is further configured to send the service interest to both the PoA and the second PoA.

2. A method implemented by a network device functioning as a point of attachment (PoA) in an information-centric networking (ICN) network, the method comprising:
   receiving, from a user equipment (UE), a registration request for network registration;
   retrieving, from the registration request, access context of the UE which identifies the UE;
   updating one or more data structures in the PoA to include the access context and a default priority set for the UE, wherein the default priority is a highest priority when the UE is the last UE to register and is associated with a forwarding priority in the ICN network;
   sending, to the UE in response to the registration request, a routing prefix with a name of the PoA, wherein the routing prefix is for routing interests of a service of the PoA; and
   sending, to a second network device functioning as a heterogeneous access point (H-AP), a message notifying the H-AP of the registration request from the UE, wherein the PoA has registered with the H-AP.

3. The method of claim 2, further comprising:

receiving a service interest for the service identifiable via a service identity (SID), wherein the PoA corresponds to a local locator for the SID;

determining, based on a data structure in the one or more data structures, that the UE provides the service;

updating a routing prefix of the service to be the UE; and forwarding the service interest to the UE.

4. The method of claim 2, further comprising:

receiving, from the UE, a de-registration request for de-registration of the UE;

updating the one or more data structures to remove the access context of the UE and the default priority set for the UE; and sending, to the H-AP, a message notifying the H-AP of the de-registration request of the UE.

* * * * *